(12) United States Patent
Khlat et al.

(10) Patent No.: US 9,793,972 B1
(45) Date of Patent: Oct. 17, 2017

(54) MULTIPLE-INPUT MULTIPLE-OUTPUT (MIMO) ANTENNA SWAPPING CIRCUIT

(71) Applicant: Qorvo US, Inc., Greensboro, NC (US)

(72) Inventors: Nadim Khlat, Cugnaux (FR); Marcus Granger-Jones, Scotts Valley, CA (US)

(73) Assignee: Qorvo US, Inc., Greensboro, NC (US)

( * ) Notice: Subject to any disclaimer, the term of this patent is extended or adjusted under 35 U.S.C. 154(b) by 0 days.

(21) Appl. No.: 15/364,358

(22) Filed: Nov. 30, 2016

Related U.S. Application Data

(60) Provisional application No. 62/317,662, filed on Apr. 4, 2016.

(51) Int. Cl.
  *H04B 7/02* (2017.01)
  *H04B 7/08* (2006.01)
  *H04B 7/0413* (2017.01)

(52) U.S. Cl.
  CPC .......... *H04B 7/0802* (2013.01); *H04B 7/0413* (2013.01)

(58) Field of Classification Search
  CPC ...... H04B 7/0413; H04B 7/0874; H04B 1/44; H04B 7/082; H04B 7/0404; H04B 1/0067; H04B 1/0483; H04B 1/3827; H04B 7/0604; H04B 7/0802; H04B 7/0808; H04B 7/0825; H04B 1/0064; H04B 1/0053; H04B 1/1027; H04B 1/126; H04B 1/38; H04B 1/48; H04B 7/02; H04B 7/08; H01Q 1/243; B81B 7/02
  USPC .......... 375/267, 260, 347, 299; 455/78, 101, 455/115.1, 13.1; 257/758, 773
  See application file for complete search history.

(56) References Cited

U.S. PATENT DOCUMENTS

| | | | |
|---|---|---|---|
| 4,641,365 A | 2/1987 | Montini, Jr. | |
| 4,853,972 A | 8/1989 | Ueda et al. | |
| 4,980,660 A | 12/1990 | Nakamura et al. | |
| 5,774,792 A | 6/1998 | Tanaka et al. | |
| 5,784,687 A | 7/1998 | Itoh et al. | |
| 5,812,939 A | 9/1998 | Kohama | |
| 5,815,803 A | 9/1998 | Ho et al. | |
| 5,815,804 A | 9/1998 | Newell et al. | |
| 5,991,607 A | 11/1999 | Burdenski et al. | |

(Continued)

OTHER PUBLICATIONS

Notice of Allowance for U.S. Appl. No. 15/130,380, dated Apr. 12, 2017, 9 pages.

*Primary Examiner* — Rahel Guarino
(74) *Attorney, Agent, or Firm* — Withrow & Terranova, P.L.L.C.

(57) ABSTRACT

Aspects disclosed herein include a multiple-input multiple-output (MIMO) antenna swapping circuit. The MIMO antenna swapping circuit includes primary switching circuitry configured to be coupled to a first antenna and a third antenna, and secondary switching circuitry configured to be coupled to a second antenna and a fourth antenna. The primary switching circuitry is coupled to the secondary switching circuitry via no more than three conductive mediums to enable antenna swapping between the first antenna, the second antenna, and the fourth antenna. By coupling the primary switching circuitry and the secondary switching circuitry via no more than three conductive mediums, it is possible to reduce the number of conductive medium in the MIMO antenna swapping circuit, thus helping to reduce cost, footprint, and complexity of the MIMO antenna swapping circuit.

22 Claims, 10 Drawing Sheets

(56) References Cited

U.S. PATENT DOCUMENTS

| | | |
|---|---|---|
| 6,002,920 A | 12/1999 | Consolazio et al. |
| 6,118,985 A | 9/2000 | Kawakyu et al. |
| 6,122,488 A | 9/2000 | Leizerovich et al. |
| 6,721,544 B1 | 4/2004 | Franca-Neto |
| 7,155,267 B2 | 12/2006 | Lee |
| 7,702,278 B2 | 4/2010 | Onomatsu et al. |
| 8,351,849 B2 | 1/2013 | Ying |
| 8,560,028 B1 | 10/2013 | Mulbrook |
| 8,594,584 B2 | 11/2013 | Greene et al. |
| 8,781,522 B2 | 7/2014 | Tran et al. |
| 2003/0232602 A1 | 12/2003 | Akiya |
| 2004/0033787 A1 | 2/2004 | Weber et al. |
| 2005/0014472 A1 | 1/2005 | Cox et al. |
| 2014/0105079 A1 | 4/2014 | Bengtsson et al. |
| 2015/0017929 A1* | 1/2015 | Ljung .................. H04B 7/0608 455/73 |
| 2016/0134016 A1 | 5/2016 | Hsu et al. |

* cited by examiner

MULTIPLE-INPUT MULTIPLE-OUTPUT (MIMO) ANTENNA SWAPPING CIRCUIT

RELATED APPLICATIONS

This application claims the benefit of U.S. Provisional Patent Application Ser. No. 62/317,662, filed Apr. 4, 2016, the disclosure of which is hereby incorporated herein by reference in its entirety.

FIELD OF THE DISCLOSURE

The present disclosure relates to supporting multiple-input multiple-output (MIMO) antennas in a wireless device.

BACKGROUND

Mobile communication devices (e.g., smartphones) have become increasingly common in current society. The prevalence of these mobile communication devices is driven in part by the many functions that are now enabled on such devices. Increased processing capabilities in such devices means that mobile communication devices have evolved from being pure communication tools into sophisticated mobile multimedia centers that enable enhanced user experiences.

The redefined user experience requires higher data rate offered by wireless communication technologies, such as long-term evolution (LTE). Particularly in light of LTE Carrier Aggregation (CA) schemes supported by modern cellular communications networks, the mobile communication devices typically support multiple frequency bands. Support for the multiple frequency bands is provided by multiple radio front-ends, each supporting one or more frequency bands. The radio front-ends are connected to a common antenna via a multiplexer (e.g., a diplexer for the dual-band scenario or a triplexer for a tri-band scenario). In addition, in order to support multiple-input multiple-output (MIMO) operation, wireless devices may also include an additional antenna(s) along with a corresponding multiplexer(s) and radio front-end(s).

Sometimes, an antenna(s) in a mobile communication device can be unintentionally blocked, for example by a user's hand, thus causing degraded antenna transmission efficiency and user experience. As such, it may be desired to switch from the blocked antenna(s) to a different antenna to improve the antenna transmission efficiency and the user experience.

SUMMARY

Aspects disclosed herein include a multiple-input multiple-output (MIMO) antenna swapping circuit. The MIMO antenna swapping circuit includes primary switching circuitry configured to be coupled to a first antenna and a third antenna, and secondary switching circuitry configured to be coupled to a second antenna and a fourth antenna. The primary switching circuitry is coupled to the secondary switching circuitry via no more than three conductive mediums to enable antenna swapping between the first antenna, the second antenna, and the fourth antenna. By coupling the primary switching circuitry and the secondary switching circuitry via no more than three conductive mediums, it is possible to reduce the number of conductive mediums in the MIMO antenna swapping circuit, thus helping to reduce cost, footprint, and complexity of the MIMO antenna swapping circuit.

In one aspect, a MIMO antenna swapping circuit is provided. The MIMO antenna swapping circuit includes primary switching circuitry configured to be coupled to a first antenna and a third antenna. The primary switching circuitry comprises a first primary antenna swapping interface and a second primary antenna swapping interface. The MIMO antenna swapping circuit also includes secondary switching circuitry configured to be coupled to a second antenna and a fourth antenna. The secondary switching circuitry includes a first secondary antenna swapping interface coupled to the second primary antenna swapping interface via no more than two first conductive mediums. The secondary switching circuitry also includes a second secondary antenna swapping interface coupled to the first primary antenna swapping interface via only one second conductive medium. The primary switching circuitry is configured to receive and provide an outgoing radio frequency (RF) communication signal to a selected antenna among the first antenna, the second antenna, and the fourth antenna for transmission over an outgoing RF communication link. A count of the no more than two first conductive mediums and the only one second conductive medium is less than four.

In another aspect, a MIMO antenna swapping circuit is provided. The MIMO antenna swapping circuit includes primary switching circuitry configured to couple at least one first primary multiplexer circuit and at least one second primary multiplexer circuit between a first antenna and a third antenna. The primary switching circuitry includes a first primary antenna swapping interface and a second primary antenna swapping interface. The primary switching circuitry also includes one or more primary switches coupled to the first primary antenna swapping interface and the second primary antenna swapping interface. The MIMO antenna swapping circuit also includes secondary switching circuitry configured to couple at least one first secondary multiplexer circuit and at least one second secondary multiplexer circuit between a second antenna and a fourth antenna. The secondary switching circuitry includes a first secondary antenna swapping interface coupled to the second primary antenna swapping interface via a first conductive medium. The secondary switching circuitry also includes a second secondary antenna swapping interface coupled to the first primary antenna swapping interface via a second conductive medium. The secondary switching circuitry also includes one or more secondary switches coupled to the first secondary antenna swapping interface and the second secondary antenna swapping interface. The primary switching circuitry is configured to receive and provide an outgoing RF communication signal to a selected antenna among the first antenna, the second antenna, and the fourth antenna for transmission over an outgoing RF communication link.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

Figure 4:
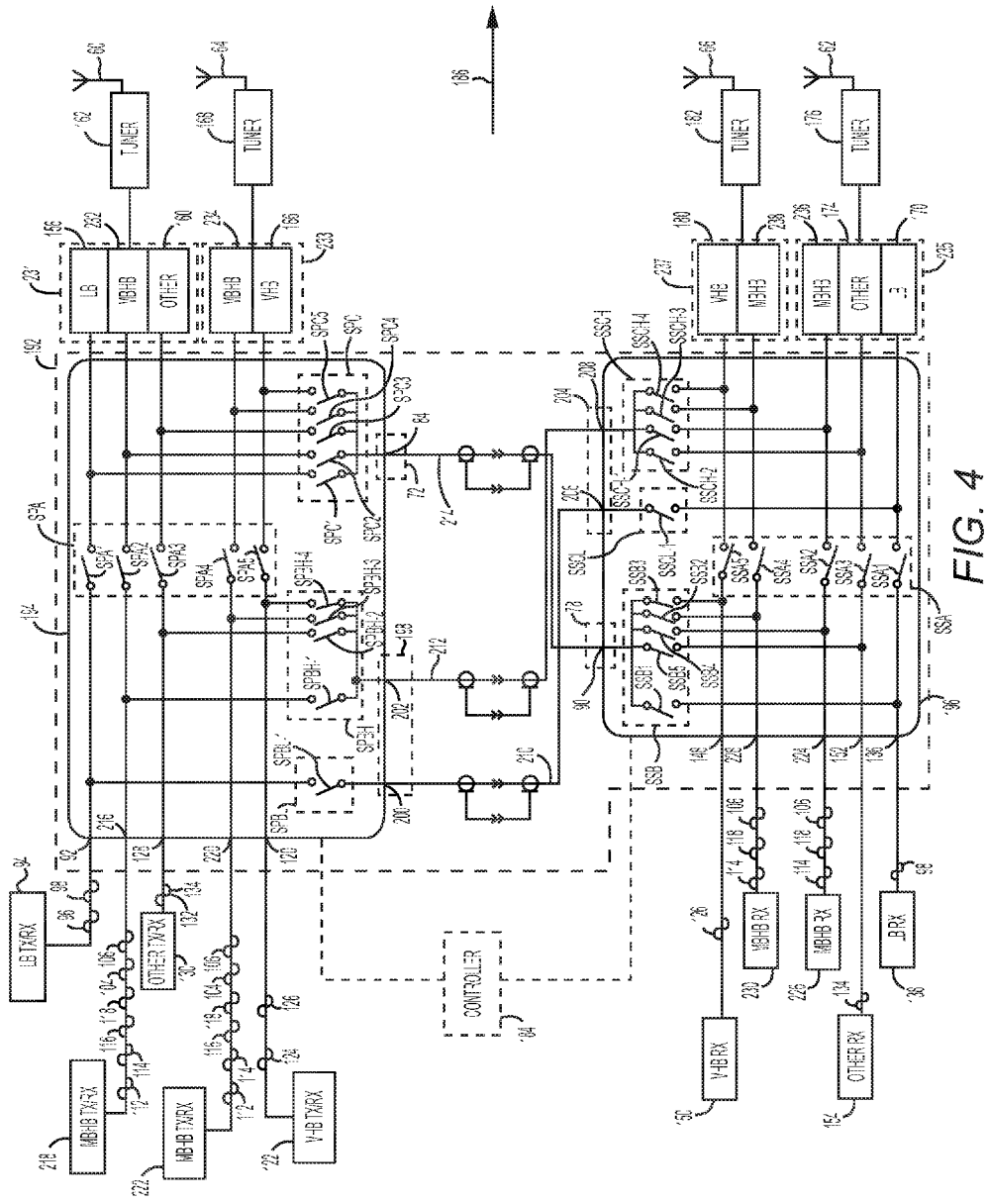
FIG. 4 is a schematic diagram of an exemplary MIMO antenna swapping circuit configured to support antenna swapping among the four antennas of FIG. 2 based on three conductive mediums.
Figure 5A:
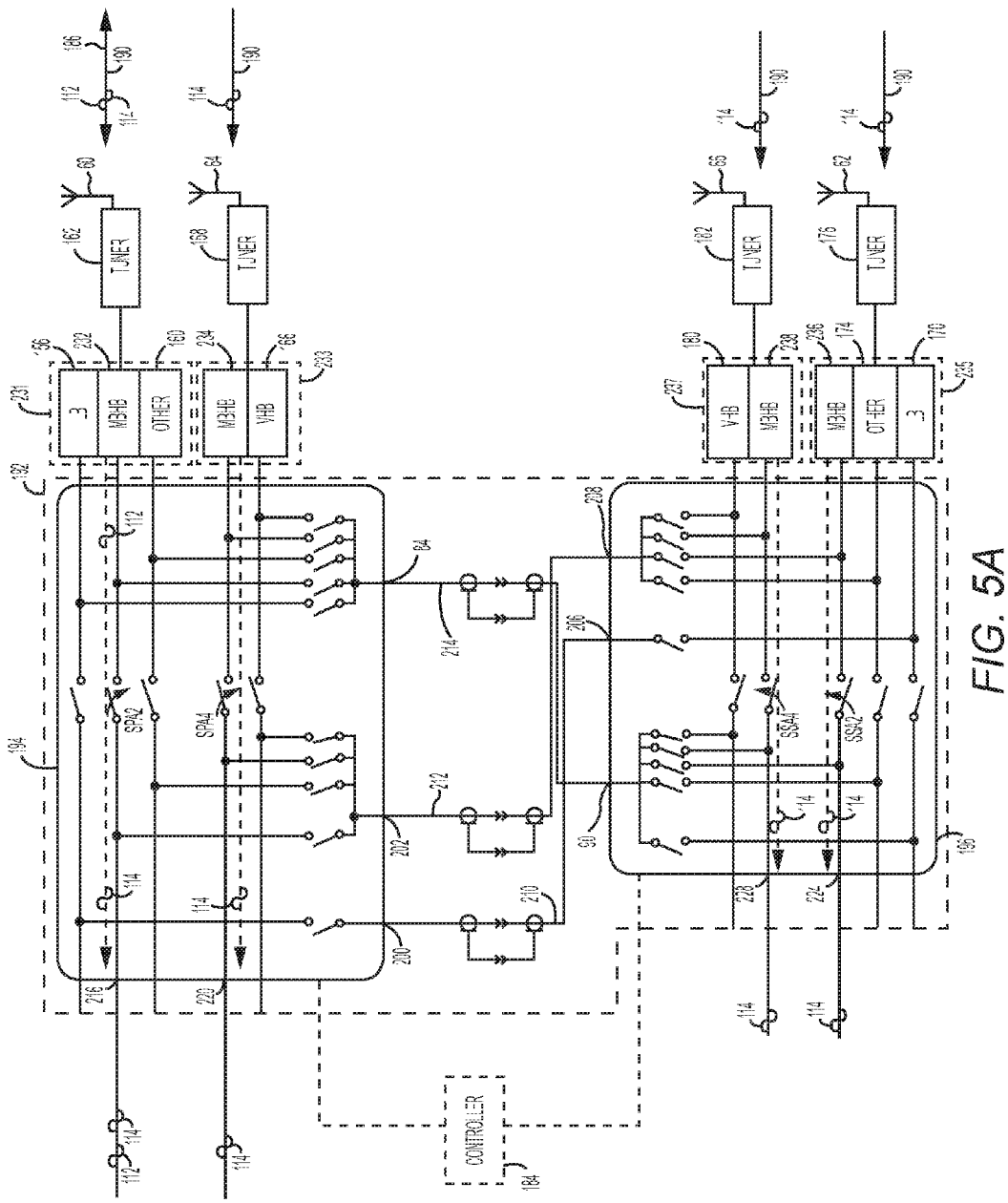
FIG. 5A is a schematic diagram providing an exemplary illustration of the MIMO antenna swapping circuit of FIG. 4 configured to provide an outgoing mid-band-high-band RF communication signal to a first antenna for transmission over an outgoing RF communication link.
Figure 5B:
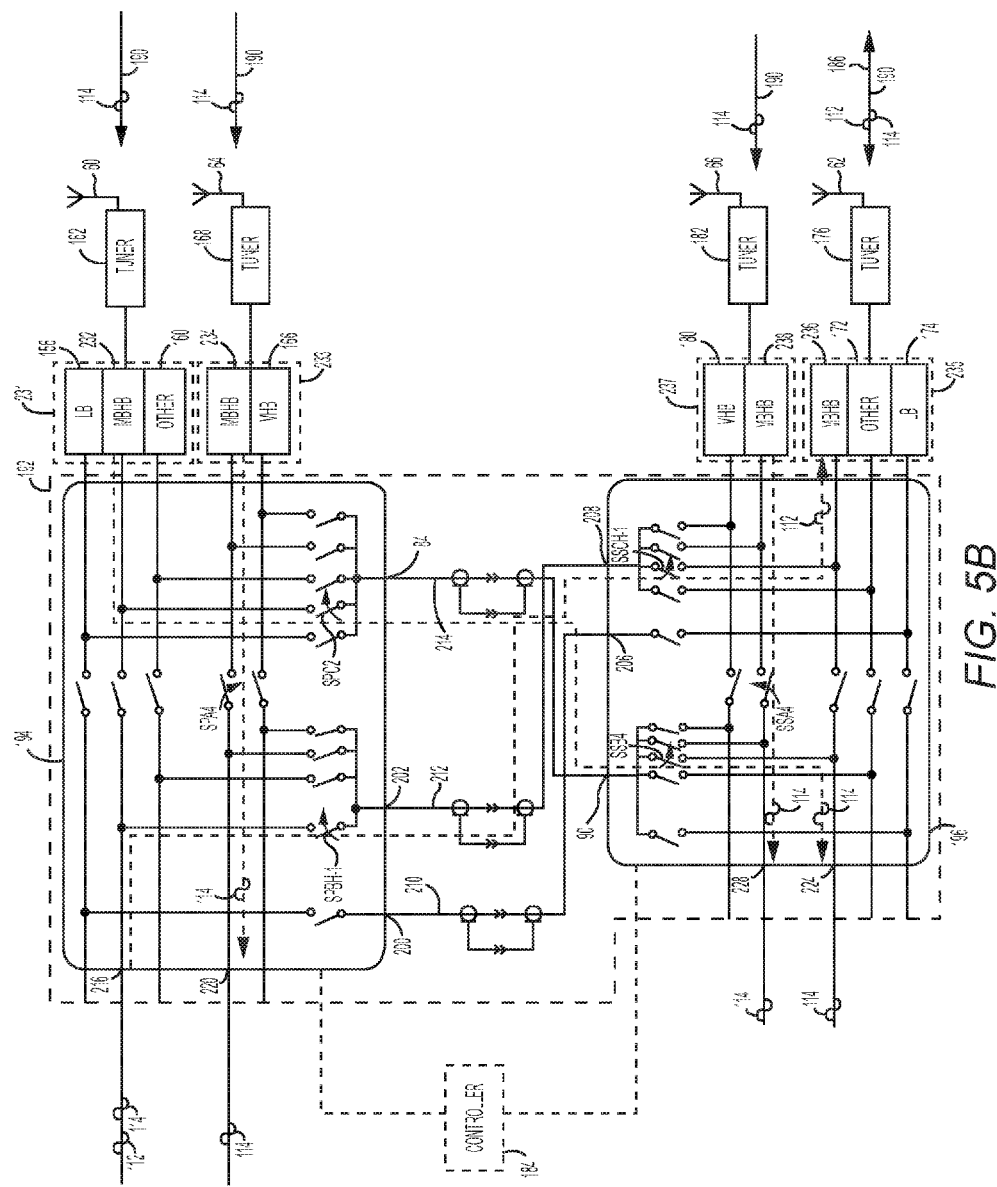
FIG. 5B is a schematic diagram providing an exemplary illustration of the MIMO antenna swapping circuit of FIG. 4 configured to provide an outgoing mid-band-high-band RF communication signal to a second antenna for transmission over an outgoing RF communication link.
Figure 5C:
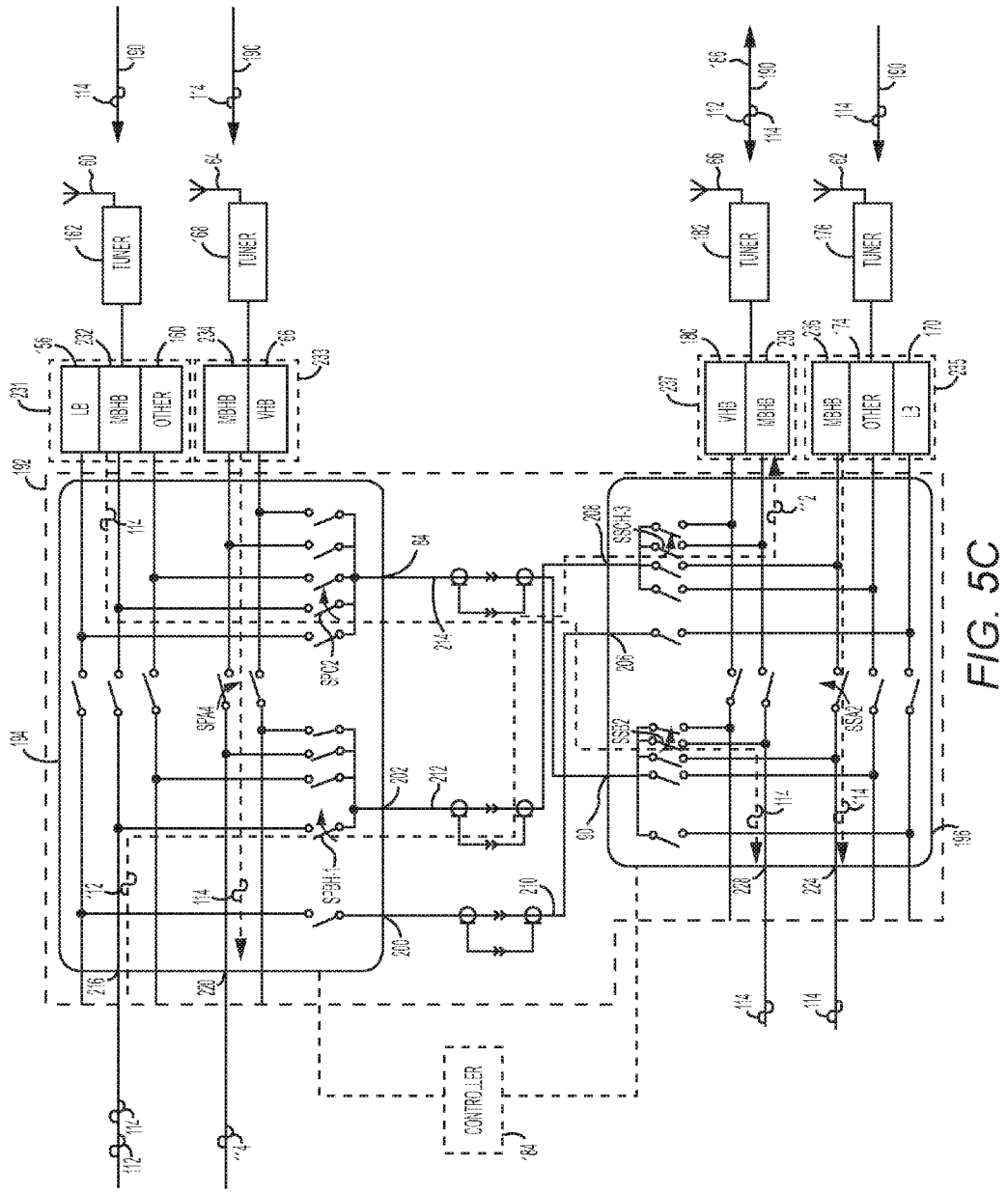
Figure 6:
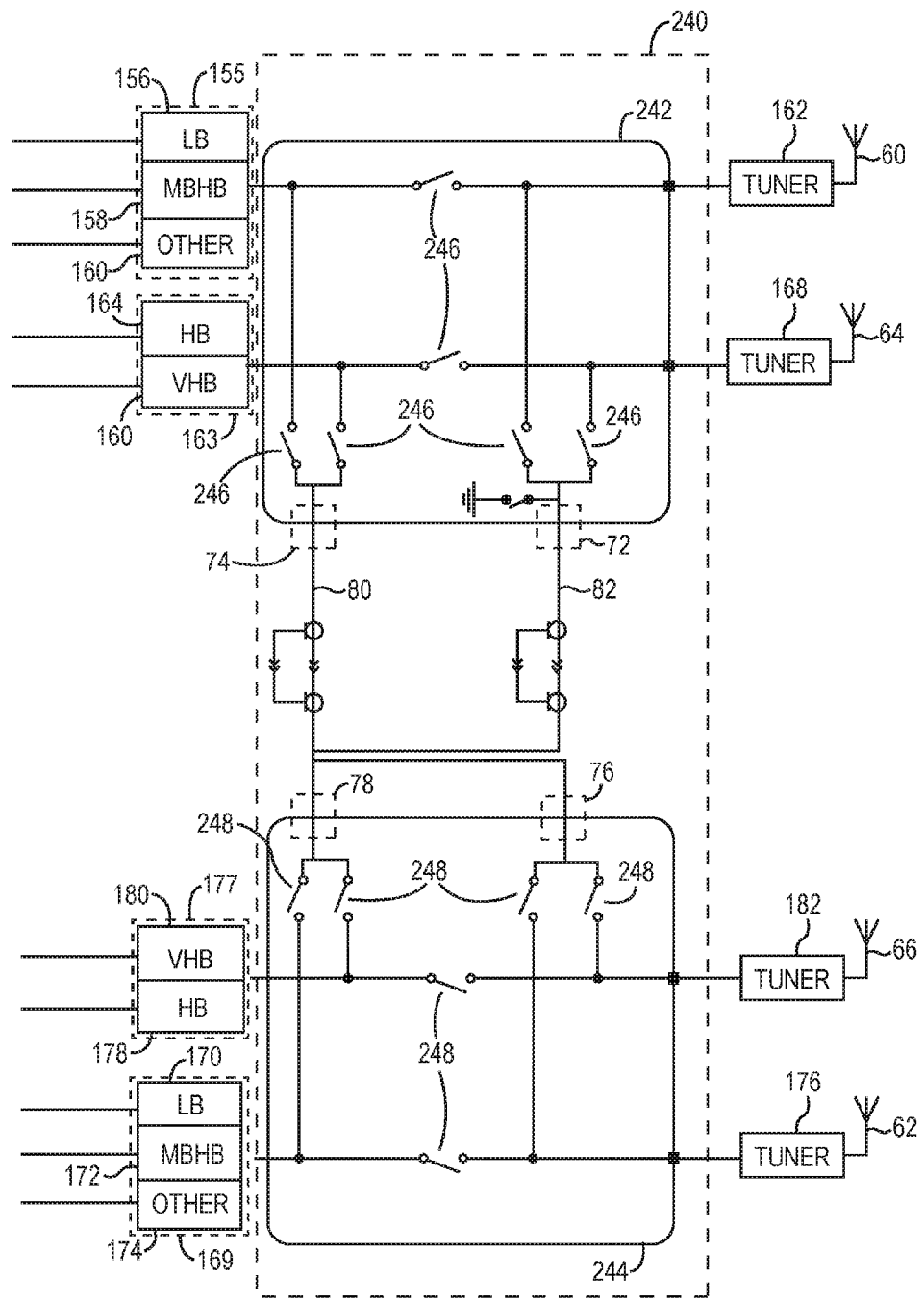

FIG. 5C is a schematic diagram providing an exemplary illustration of the MIMO antenna swapping circuit of FIG. 4 configured to provide an outgoing mid-band-high-band RF communication signal to a fourth antenna for transmission over an outgoing RF communication link; and FIG. 6 is a schematic diagram of an exemplary MIMO antenna swapping circuit including primary switching circuitry and secondary switching circuitry with high linearity.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Aspects disclosed herein include a multiple-input multiple-output (MIMO) antenna swapping circuit. The MIMO antenna swapping circuit includes primary switching circuitry configured to be coupled to a first antenna and a third antenna, and secondary switching circuitry configured to be coupled to a second antenna and a fourth antenna. The primary switching circuitry is coupled to the secondary switching circuitry via no more than three conductive mediums to enable antenna swapping between the first antenna, the second antenna, and the fourth antenna. By coupling the primary switching circuitry and the secondary switching circuitry via no more than three conductive medium, it is possible to reduce the number of conductive mediums in the MIMO antenna swapping circuit, thus helping to reduce cost, footprint, and complexity of the MIMO antenna swapping circuit.

Figure 1:
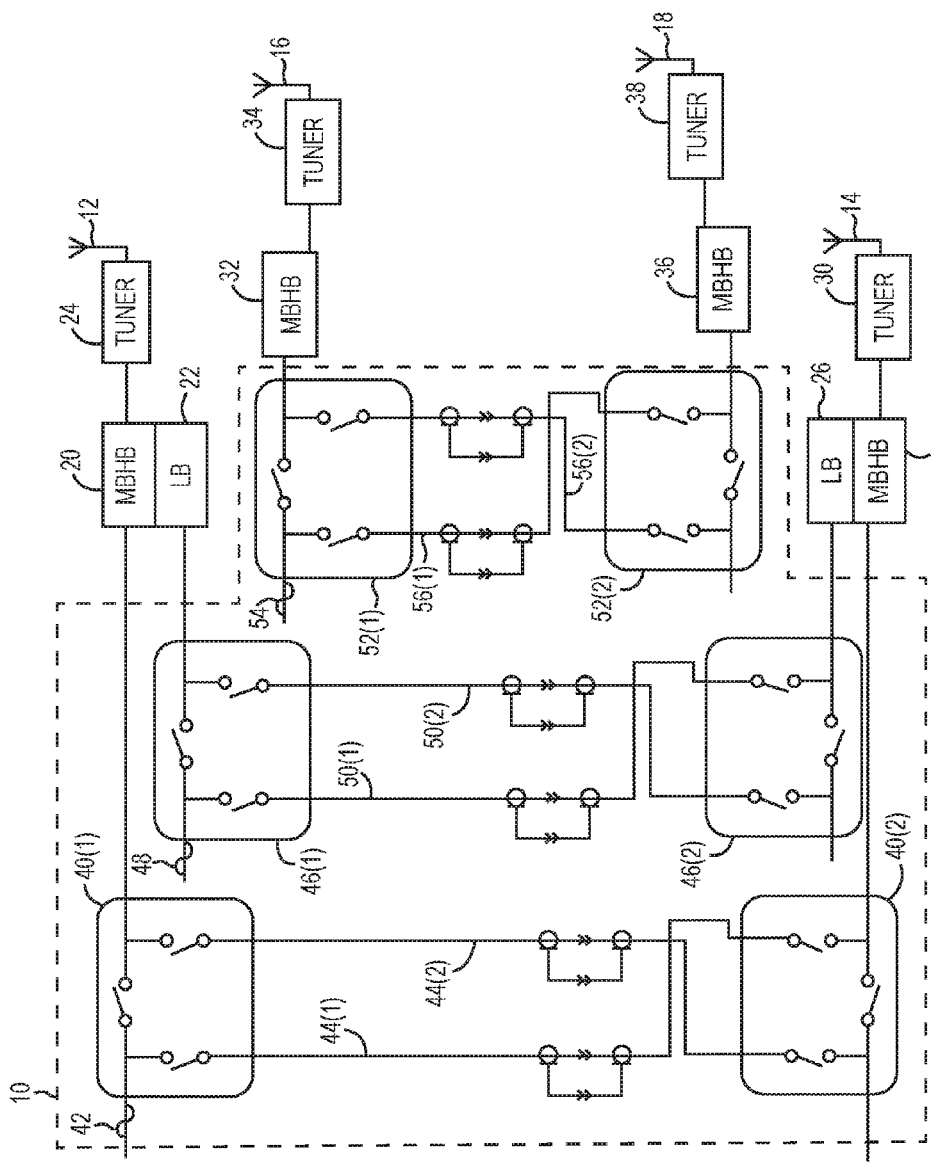
FIG. 1 is a schematic diagram of an exemplary conventional multiple-input multiple-output (MIMO) antenna swapping circuit configured to support antenna swapping between four antennas based on at least four conductive mediums.

Before discussing exemplary aspects of a MIMO antenna swapping circuit that include specific aspects of the present disclosure, a brief overview of a conventional MIMO antenna swapping circuit for enabling antenna swapping is first provided in FIG. 1. The discussion of specific exemplary aspects of the MIMO antenna swapping circuit starts below with reference to FIG. 2.

In this regard, FIG. 1 is a schematic diagram of an exemplary conventional MIMO antenna swapping circuit 10 configured to support antenna swapping between a first antenna 12, a second antenna 14, a third antenna 16, and a fourth antenna 18 based on at least four conductive mediums. The first antenna 12 is coupled to a first mid-band-high-band (MBHB) pass filter 20 and a first low-band (LB) pass filter 22 via a first tuner 24. The second antenna 14 is coupled to a second LB pass filter 26 and a second MBHB pass filter 28 via a second tuner 30. The third antenna 16 is coupled to a third MBHB filter 32 via a third tuner 34. The fourth antenna 18 is coupled to a fourth MBHB filter 36 via a fourth tuner 38. As discussed below, the conventional MIMO antenna swapping circuit 10 requires at least four conductive mediums to support antenna swapping between the first antenna 12, the second antenna 14, the third antenna 16, and the fourth antenna 18.

The conventional MIMO antenna swapping circuit 10 includes a pair of first switches 40(1), 40(2) configured to enable antenna swapping for an MB signal 42 between the first antenna 12 and the second antenna 14. The pair of first switches 40(1), 40(2) is coupled via a pair of first conductive mediums 44(1), 44(2) to enable full-duplex signal exchange. The conventional MIMO antenna swapping circuit 10 includes a pair of second switches 46(1), 46(2) configured to enable antenna swapping for an LB signal 48 between the first antenna 12 and the second antenna 14. The pair of second switches 46(1), 46(2) is coupled via a pair of second conductive mediums 50(1), 50(2) to enable full-duplex signal exchange. The conventional MIMO antenna swapping circuit 10 includes a pair of third switches 52(1), 52(2) configured to enable antenna swapping for an HB signal 54 between the third antenna 16 and the fourth antenna 18. The pair of third switches 52(1), 52(2) is coupled via a pair of third conductive mediums 56(1), 56(2) to enable full-duplex signal exchange.

The conventional MIMO antenna swapping circuit 10 addresses non-linearity concern for uplink carrier aggregation (UL CA) intermodulation products and downlink carrier aggregation (DL CA) harmonics. This is because, for example, the harmonics associated with the LB signal 48 by the pair of second switches 46(1), 46(2) can be filtered by the first LB pass filter 22 and/or the second LB pass filter 26. For more details on the design considerations of the conventional MIMO antenna swapping circuit 10, please refer to U.S. patent application Ser. No. 15/130,380, filed Apr. 15, 2016, now U.S. Pat. No. 9,735,854, entitled "SYSTEMS FOR ANTENNA SWAPPING SWITCHING AND METHODS OF OPERATION THEREOF," the disclosure of which is incorporated herein by reference in its entirety.

However, the conventional MIMO antenna swapping circuit 10 requires a dedicated pair of conductive mediums (e.g., coaxial cables) to enable antenna swapping between each pair of antennas and for each band-specific signal, such as the MB signal 42, the LB signal 48, and the HB signal 54. For example, the conventional MIMO antenna swapping circuit 10 would require at least four conductive mediums to swap the MB signal 42 among the first antenna 12, the second antenna 14, and the fourth antenna 18. Likewise, the conventional MIMO antenna swapping circuit 10 would require another four conductive mediums to swap the LB signal 48 among the first antenna 12, the second antenna 14, and the fourth antenna 18. These extra conductive mediums can lead to increased cost, footprint, and complexity of the conventional MIMO antenna swapping circuit 10. Hence, it may be desired to support MIMO antenna swapping with a reduced number of conductive mediums.

Figure 2:
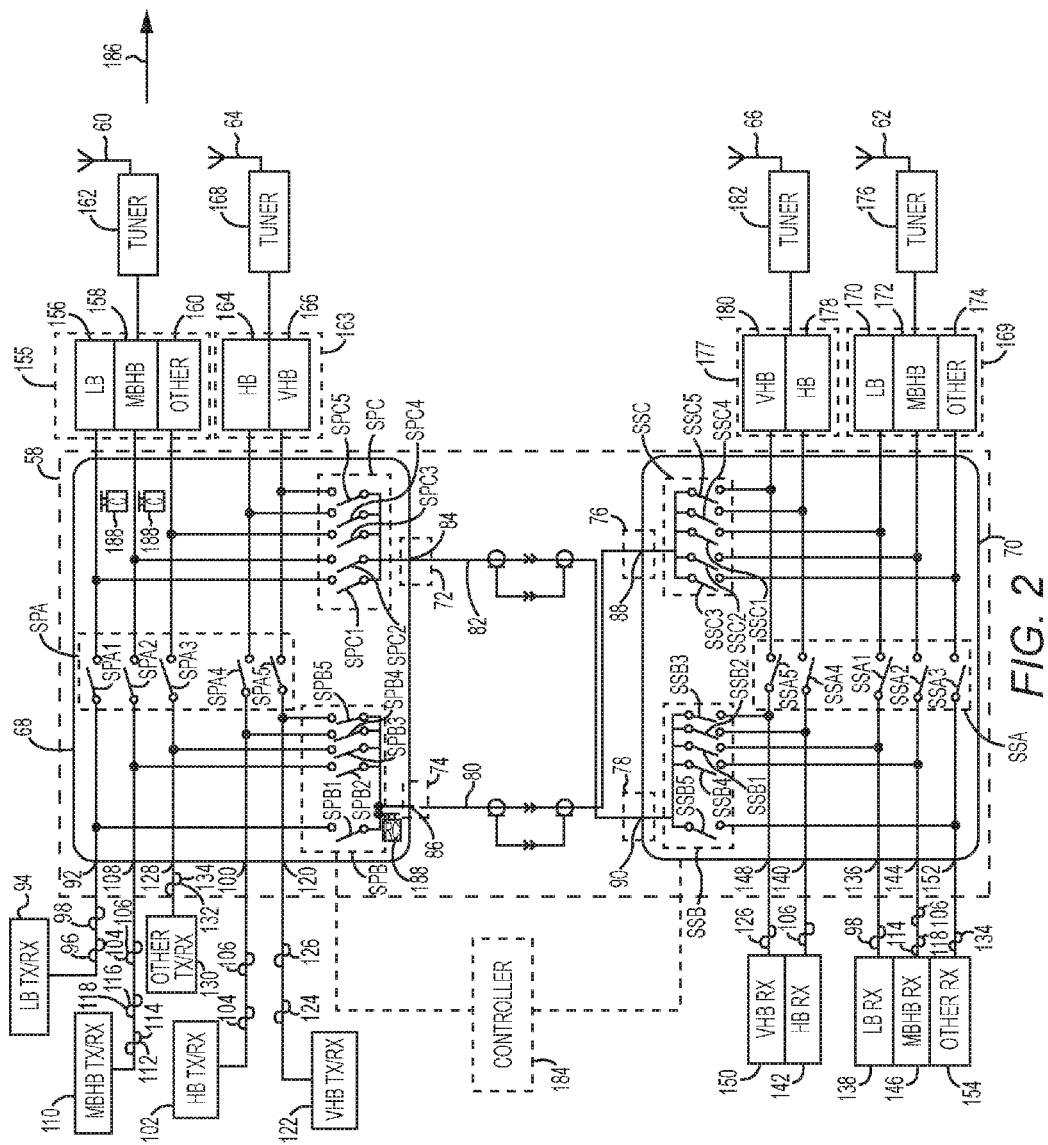
FIG. 2 is a schematic diagram of an exemplary MIMO antenna swapping circuit configured to support antenna swapping among four antennas based on a single pair of conductive mediums.

As discussed in details below with reference to FIGS. 2 and 4, it is possible to support antenna swapping among four antennas based on less than four conductive mediums. More specifically, FIG. 2 illustrates an antenna swapping solution based on a single pair or conductive mediums, while FIG. 4 illustrates another antenna swapping solution based on three conductive mediums. As such, the antenna swapping solutions discussed herein with reference to FIGS. 2 and 4 can reduce the number of conductive mediums, thus leading to reduced cast, footprint, and complexity associated with MIMO antenna swapping.

In this regard, FIG. 2 is a schematic diagram of an exemplary MIMO antenna swapping circuit 58 configured to support antenna swapping among a first antenna 60, a second antenna 62, a third antenna 64, and a fourth antenna 66 based on a single pair of conductive mediums. The MIMO antenna swapping circuit 58 includes primary switching circuitry 68 and secondary switching circuitry 70. In a non-limiting example, the primary switching circuitry 68 and the secondary switching circuitry 70 are each provided as a single-die integrated circuit (IC). In another non-limiting example, the primary switching circuitry 68 and the secondary switching circuitry 70 are provided in the same single-die IC.

The primary switching circuitry 68 is configured to be coupled to the first antenna 60 and the third antenna 64. The primary switching circuitry 68 includes a first primary antenna swapping interface 72 and a second primary antenna swapping interface 74. The secondary switching circuitry 70 is configured to be coupled to the second antenna 62 and the fourth antenna 66. The secondary switching circuitry 70 includes a first secondary antenna swapping interface 76 and a second secondary antenna swapping interface 78. The first secondary antenna swapping interface 76 is coupled to the second primary antenna swapping interface 74 via a first conductive medium 80. The second secondary antenna swapping interface 78 is coupled to the first primary antenna swapping interface 72 via a second conductive medium 82. In this regard, the primary switching circuitry 68 is coupled to the secondary switching circuitry 70 via the single pair of conductive mediums that includes the first conductive medium 80 and the second conductive medium 82. In a non-limiting example, the first conductive medium 80 and the second conductive medium 82 can be provided via coaxial cables, conductive traces, and other conductive links.

More specifically, the first primary antenna swapping interface 72 includes a first primary antenna swapping port 84. The second primary antenna swapping interface 74 includes a second primary antenna swapping port 86. The first secondary antenna swapping interface 76 includes a first secondary antenna swapping port 88. The second secondary antenna swapping interface 78 includes a second secondary antenna swapping port 90. The first secondary antenna swapping port 88 and the second secondary antenna swapping port 90 are coupled to the second primary antenna swapping port 86 and the first primary antenna swapping port 84 via the first conductive medium 80 and the second conductive medium 82, respectively.

The primary switching circuitry 68 includes a primary low-band input/output (I/O) port 92 configured to be coupled to a first low-band transceiver 94 (shown as LB TX/RX in FIG. 2). In a non-limiting example, the first low-band transceiver 94 is configured to transmit an outgoing low-band RF communication signal 96 and receive an incoming low-band RF communication signal 98 in a 450-960 MHz spectrum. In another non-limiting example, the outgoing low-band RF communication signal 96 and the incoming low-band RF communication signal 98 can be carrier aggregated low-band RF communication signals.

The primary switching circuitry 68 includes a primary high-band I/O port 100 configured to be coupled to a first high-band transceiver 102 (shown as HB TX/RX in FIG. 2). In a non-limiting example, the first high-band transceiver 102 is configured to transmit an outgoing high-band RF communication signal 104 and receive an incoming high-band RF communication signal 106 in a 2300-2690 MHz spectrum. In another non-limiting example, the outgoing high-band RF communication signal 104 and the incoming high-band RF communication signal 106 can be carrier aggregated low-band RF communication signals.

The primary switching circuitry 68 includes a primary mid-band-high-band I/O port 108 configured to be coupled to a first mid-band-high-band transceiver 110 (shown as MBHB TX/RX in FIG. 2). In a non-limiting example, the first mid-band-high-band transceiver 110 is configured to transmit an outgoing mid-band-high-band RF communication signal 112 and receive an incoming mid-band-high-band RF communication signal 114 in a 1710-2700 MHz spectrum. In this regard, the first mid-band-high-band transceiver 110 can be configured to transmit the outgoing high-band RF communication signal 104 and receive the incoming high-band RF communication signal 106 in the 2300-2700 MHz spectrum. The first mid-band-high-band transceiver 110 can also be configured to transmit an outgoing mid-band RF communication signal 116 and receive an incoming mid-band RF communication signal 118 in the 1710-2200 MHz spectrum. The first mid-band-high-band transceiver 110 can also be configured to transmit the outgoing mid-band-high-band RF communication signal 112 as an aggregated outgoing RF communication signal including the outgoing mid-band RF communication signal 116 and the outgoing high-band RF communication signal 104. The first mid-band-high-band transceiver 110 can also be configured to receive the incoming mid-band-high-band RF communication signal 114 as an aggregated incoming RF communication signal including the incoming mid-band RF communication signal 118 and the incoming high-band RF communication signal 106.

The primary switching circuitry 68 may include a primary very-high-band I/O port 120 configured to be coupled to a first very-high-band transceiver 122 (shown as VHB TX/RX in FIG. 2). In a non-limiting example, the first very-high-band transceiver 122 is configured to transmit an outgoing very-high-band RF communication signal 124 and receive an incoming very-high-band RF communication signal 126 in a 3400-3800 MHz spectrum and beyond. In another non-limiting example, the outgoing very-high-band RF communication signal 124 and the incoming very-high-band RF communication signal 126 can be carrier aggregated low-band RF communication signals.

The primary switching circuitry 68 may include a primary other-band I/O port 128 configured to be coupled to a first other-band transceiver 130 (shown as Other TX/RX in FIG. 2). In a non-limiting example, the first other-band transceiver 130 is configured to transmit an outgoing other-band RF communication signal 132 and receive an incoming other-band RF communication signal 134 in a 5-6 GHz spectrum. In another non-limiting example, the outgoing other-band RF communication signal 132 and the incoming other-band RF communication signal 134 can be carrier aggregated low-band RF communication signals.

The secondary switching circuitry 70 includes a secondary low-band I/O port 136 configured to be coupled to a second low-band receiver 138 (shown as LB RX in FIG. 2). In a non-limiting example, the second low-band receiver 138 is configured to receive the incoming low-band RF communication signal 98 in the 450-960 MHz spectrum. The secondary switching circuitry 70 includes a secondary high-band I/O port 140 configured to be coupled to a second high-band receiver 142 (shown as HB RX in FIG. 2). In a non-limiting example, the second high-band receiver 142 is configured to receive the incoming high-band RF communication signal 106 in the 2300-2700 MHz spectrum.

The secondary switching circuitry 70 includes a secondary mid-band-high-band I/O port 144 configured to be coupled to a second mid-band-high-band receiver 146 (shown as MBHB RX in FIG. 2). In a non-limiting example, the second mid-band-high-band receiver 146 is configured to receive the incoming mid-band-high-band RF communication signal 114 in the 1710-2700 MHz spectrum. Accordingly, the second mid-band-high-band receiver 146 can receive the incoming high-band RF communication signal 106 in the 2300-2700 MHz spectrum or the incoming mid-band RF communication signal 118 in the 1710-2200 MHz spectrum. The second mid-band-high-band receiver 146 can also receive the aggregated incoming RF communication signal including the incoming mid-band RF communication signal 118 and the incoming high-band RF communication signal 106.

The secondary switching circuitry 70 may include a secondary very-high-band I/O port 148 configured to be coupled to a second very-high-band receiver 150 (shown as VHB RX in FIG. 2). In a non-limiting example, the second very-high-band receiver 150 is configured to receive the incoming very-high-band RF communication signal 126 in the 3400-3800 MHz spectrum. The secondary switching circuitry 70 may include a secondary other-band I/O port 152 configured to be coupled to a second other-band receiver 154 (shown as Other RX in FIG. 2). In a non-limiting example, the second other-band receiver 154 is configured to receive the incoming other-band RF communication signal 134 in the 5-6 GHz spectrum.

With continuing reference to FIG. 2, the primary switching circuitry 68 can be coupled to the first antenna 60 via at least one first primary multiplexer circuit 155, which can be a duplexer circuit, a triplexer circuit, or a quadplexer circuit, for example. The first primary multiplexer 155 includes a primary low-band pass filter 156, a primary mid-band-high-band pass filter 158, and a primary other-band pass filter 160. In this regard, the primary switching circuitry 68 can be coupled to the first antenna 60 via the primary low-band pass filter 156, the primary mid-band-high-band pass filter 158, and/or the primary other-band pass filter 160. The primary low-band pass filter 156, the primary mid-band-high-band pass filter 158, and the primary other-band pass filter 160 may be coupled to the first antenna 60 via a respective tuner 162. The primary switching circuitry 68 can be coupled to the third antenna 64 via at least one second primary multiplexer circuit 163, which can be a duplexer circuit, a triplexer circuit, or a quadplexer circuit, for example. The second primary multiplexer circuit 163 includes a primary high-band pass filter 164 and a primary very-high-band pass filter 166. In this regard, the primary switching circuitry 68 can be coupled to the third antenna 64 via the primary high-band pass filter 164 and/or the primary very-high-band pass filter 166. The primary high-band pass filter 164 and the primary very-high-band pass filter 166 may be coupled to the third antenna 64 via a respective tuner 168.

The secondary switching circuitry 70 can be coupled to the second antenna 62 via at least one first secondary multiplexer circuit 169, which can be a duplexer circuit, a triplexer circuit, or a quadplexer circuit, for example. The first secondary multiplexer circuit 169 includes a secondary low-band pass filter 170, a secondary mid-band-high-band pass filter 172, and a secondary other-band pass filter 174. In this regard, the secondary switching circuitry 70 can be coupled to the second antenna 62 via the secondary low-band pass filter 170, the secondary mid-band-high-band pass filter 172, and/or the secondary other-band pass filter 174. The secondary low-band pass filter 170, the secondary mid-band-high-band pass filter 172, and the secondary other-band pass filter 174 may be coupled to the second antenna 62 via a respective tuner 176. The secondary switching circuitry 70 can be coupled to the fourth antenna 66 via at least one second secondary multiplexer circuit 177, which can be a duplexer circuit, a triplexer circuit, or a quadplexer circuit, for example. The second secondary multiplexer circuit 177 includes a secondary high-band pass filter 178 and a secondary very-high-band pass filter 180. In this regard, the secondary switching circuitry 70 can be coupled to the fourth antenna 66 via the secondary high-band pass filter 178 and/or the secondary very-high-band pass filter 180. In a non-limiting example, the second secondary multiplexer circuit 177 can be a higher order multiplexer circuit supporting high-band, very-high-band, and/or industrial, scientific, and medical (ISM) 5 GHz band. The secondary high-band pass filter 178 and the secondary very-high-band pass filter 180 may be coupled to the fourth antenna 66 via a respective tuner 182.

With continuing reference to FIG. 2, the primary switching circuitry 68 includes a first primary switching element SPA, a second primary switching element SPB, and a third primary switching element SPC. The first primary switching element SPA includes switches SPA1, SPA2, SPA3, SPA4, and SPA5. The second primary switching element SPB includes switches SPB1, SPB2, SPB3, SPB4, and SPB5. The third primary switching element SPC includes switches SPC1, SPC2, SPC3, SPC4, and SPC5. The secondary switching circuitry 70 includes a first secondary switching element SSA, a second secondary switching element SSB, and a third secondary switching element SSC. The first secondary switching element SSA includes switches SSA1, SSA2, SSA3, SSA4, and SSA5. The second secondary switching element SSB includes switches SSB1, SSB2, SSB3, SSB4, and SSB5. The third secondary switching element SSC includes switches SSC1, SSC2, SSC3, SSC4, and SSC5.

The primary switching circuitry 68 and the secondary switching circuitry 70 are configured to be controlled by a controller 184, which can be a microcontroller, a microprocessor, or a digital signal processor (DSP) for example. The controller 184 controls the primary switching circuitry 68 and the secondary switching circuitry 70 to provide an outgoing RF communication signal to a selected antenna among the first antenna 60, the second antenna 62, and the fourth antenna 66 for transmission over an outgoing RF communication link 186. The outgoing RF communication signal, which is not shown in FIG. 2, can be any of the outgoing low-band RF communication signal 96, the outgoing mid-band RF communication signal 116, the outgoing high-band RF communication signal 104, the outgoing mid-band-high-band RF communication signal 112, the outgoing very-high-band RF communication signal 124, and the outgoing other-band RF communication signal 132.

The MIMO antenna swapping circuit 58 further includes one or more passive couplers 188. Each of the passive couplers 188 is activated by an outgoing RF communication signal (e.g., the outgoing high-band RF communication signal 104) and configured to provide a fraction (e.g., 1%) of the forward-coupling power of the outgoing RF communication signal back to the transceiver (e.g., the first mid-band-high-band transceiver 110) to help provide power control.

Figure 3A:
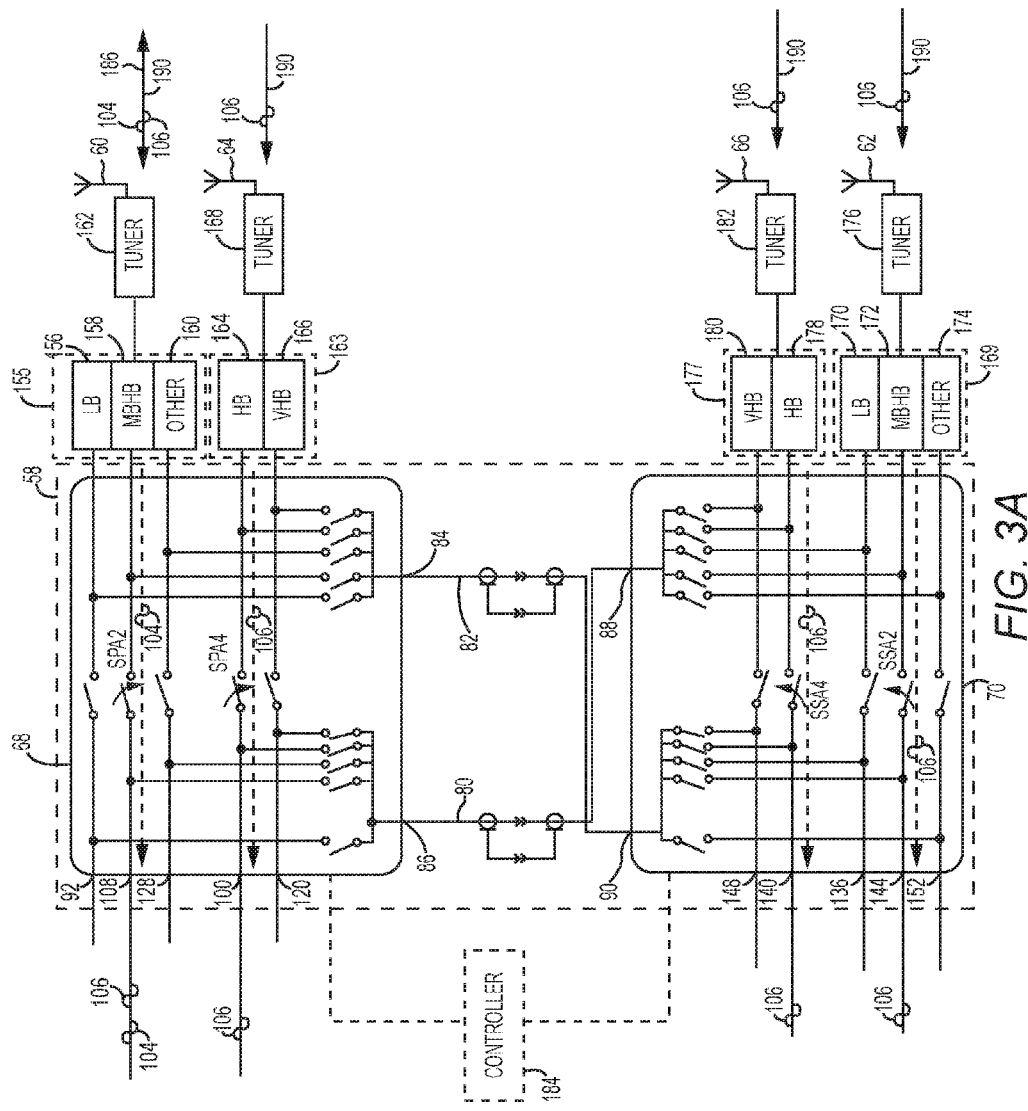
FIG. 3A is a schematic diagram providing an exemplary illustration of the MIMO antenna swapping circuit of FIG. 2 configured to provide an outgoing high-band radio frequency (RF) communication signal to a first antenna for transmission over an outgoing RF communication link.
Figure 3B:
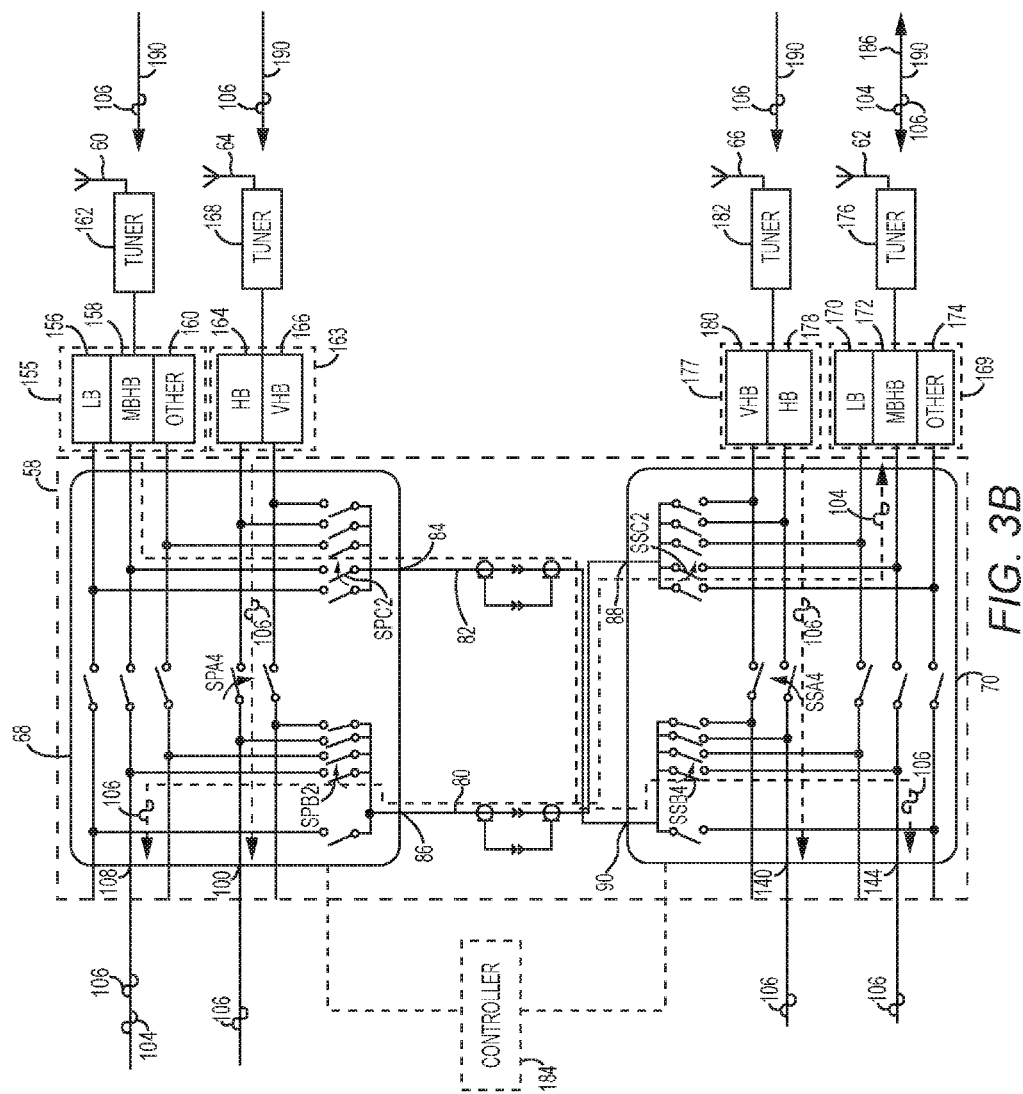
FIG. 3B is a schematic diagram providing an exemplary illustration of the MIMO antenna swapping circuit of FIG. 2 configured to provide an outgoing high-band RF communication signal to a second antenna for transmission over an outgoing RF communication link.
Figure 3C:
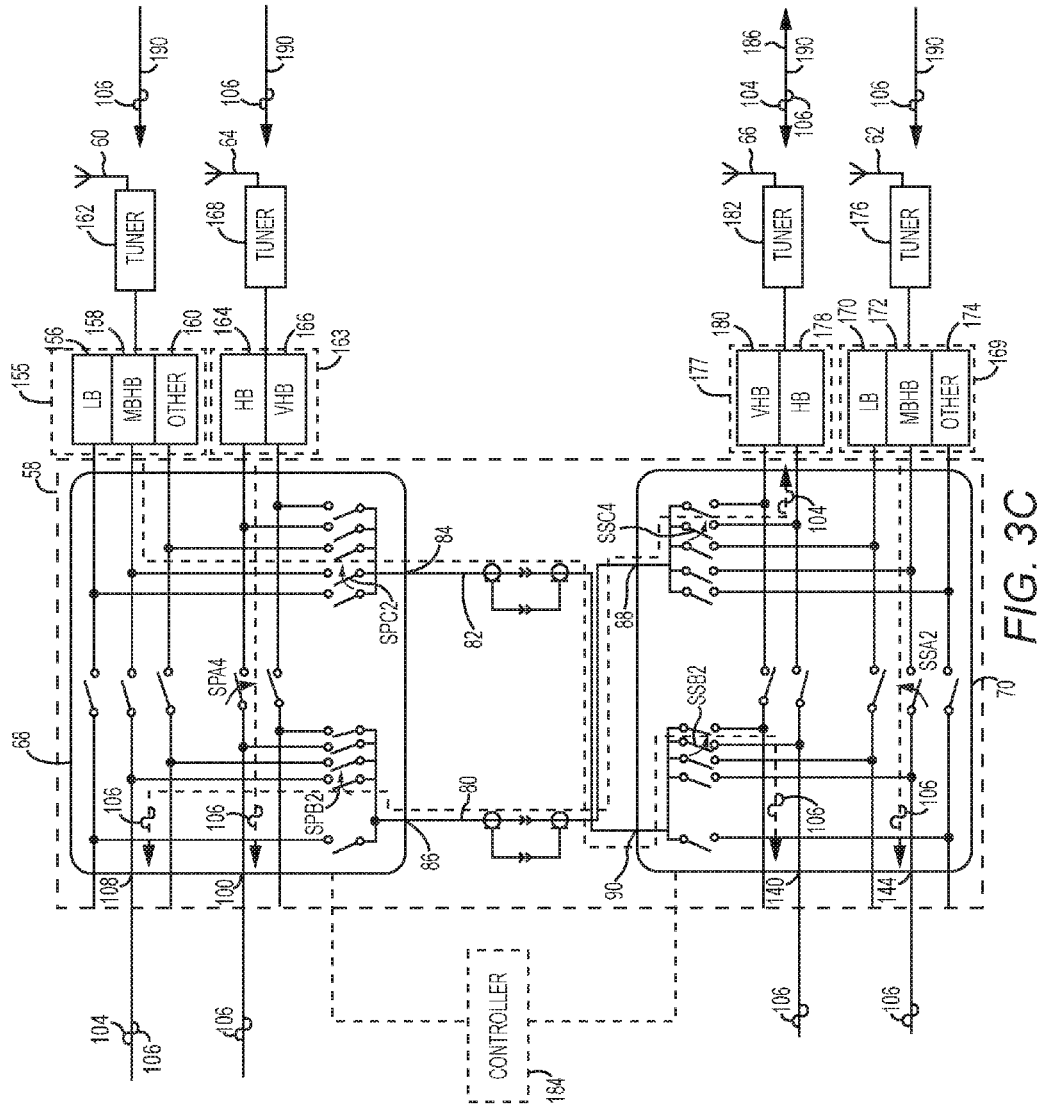
FIG. 3C is a schematic diagram providing an exemplary illustration of the MIMO antenna swapping circuit of FIG. 2 configured to provide an outgoing high-band RF communication signal to a fourth antenna for transmission over an outgoing RF communication link.

To help illustrate operational principles of the MIMO antenna swapping circuit 58, FIGS. 3A-3C are discussed next as non-limiting examples. It shall be appreciated that the working examples discussed with reference to FIGS. 3A-3C do not represent all possible antenna swapping scenarios that can be supported by the MIMO antenna swapping circuit 58. Common elements between FIGS. 2 and 3A-3C are shown therein with common element numbers and will not be re-described herein. It is further assumed that the switches in the first primary switching element SPA, the second primary switching element SPB, the third primary switching element SPC, the first secondary switching element SSA, the second secondary switching element SSB, and the third secondary switching element SSC are in an open position at a start of an antenna swapping operation.

FIG. 3A is a schematic diagram providing an exemplary illustration of the MIMO antenna swapping circuit 58 of FIG. 2 configured to provide the outgoing high-band RF communication signal 104 to the first antenna 60 (the selected antenna) for transmission over the outgoing RF communication link 186. The primary switching circuitry 68 receives the outgoing high-band RF communication signal 104 from the primary mid-band-high-band I/O port 108. The controller 184 controls the primary switching circuitry 68 to close the switch SPA2 to couple the primary mid-band-high-band I/O port 108 to the primary mid-band-high-band pass filter 158. Accordingly, the first antenna 60 can transmit the outgoing high-band RF communication signal 104 over the outgoing RF communication link 186.

When the outgoing RF communication link 186 is a frequency division duplexing (FDD) communication link, the first antenna 60, the second antenna 62, the third antenna 64, and the fourth antenna 66 can concurrently receive the incoming high-band RF communication signal 106 over an incoming RF communication link 190, which is also an FDD communication link. In this regard, the primary switching circuitry 68 receives the incoming high-band RF communication signal 106 via the first antenna 60 and provides the incoming high-band RF communication signal 106 to the primary mid-band-high-band I/O port 108. In addition, the controller 184 controls the primary switching circuitry 68 to close the switch SPA4 to couple the primary high-band I/O port 100 to the primary high-band pass filter 164 to receive the incoming high-band RF communication signal 106 via the third antenna 64. The controller 184 further controls the secondary switching circuitry 70 to close the switch SSA2 to couple the secondary mid-band-high-band I/O port 144 to the secondary mid-band-high-band pass filter 172 to receive the incoming high-band RF communication signal 106 via the second antenna 62. The controller 184 further controls the secondary switching circuitry 70 to close the switch SSA4 to couple the secondary high-band I/O port 140 to the secondary high-band pass filter 178 to receive the incoming high-band RF communication signal 106 via the fourth antenna 66. In this regard, the MIMO antenna swapping circuit 58 is configured to receive the incoming high-band RF communication signal 106 via the first antenna 60, the second antenna 62, the third antenna 64, and the fourth antenna 66, while transmitting concurrently the outgoing high-band RF communication signal 104 via the first antenna 60. Such operation may also be referred to as a multiple input single output (MISO) antenna operation.

In contrast, if the outgoing RF communication link 186 and the incoming RF communication link 190 are configured to operate according to time division duplexing (TDD), the MIMO antenna swapping circuit 58 can only receive the incoming high-band RF communication signal 106 via the first antenna 60, the second antenna 62, the third antenna 64, and the fourth antenna 66 when the first antenna 60 is not transmitting the outgoing high-band RF communication signal 104.

FIG. 3B is a schematic diagram providing an exemplary illustration of the MIMO antenna swapping circuit 58 of FIG. 2 configured to provide the outgoing high-band RF communication signal 104 to the second antenna 62 (the selected antenna) for transmission over the outgoing RF communication link 186. The primary switching circuitry 68 receives the outgoing high-band RF communication signal 104 from the primary mid-band-high-band I/O port 108. The controller 184 controls the primary switching circuitry 68 to close the switch SPB2 to couple the primary mid-band-high-band I/O port 108 to the second primary antenna swapping port 86 to provide the outgoing high-band RF communication signal 104 to the first secondary antenna swapping port 88 via the first conductive medium 80. The secondary switching circuitry 70 receives the outgoing high-band RF communication signal 104 from the first secondary antenna swapping port 88. The controller 184 also controls the secondary switching circuitry 70 to close the switch SSC2 to couple the first secondary antenna swapping port 88 to the secondary mid-band-high-band pass filter 172 to provide the outgoing high-band RF communication signal 104 to the second antenna 62 for transmission over the outgoing RF communication link 186.

When the outgoing RF communication link 186 is an FDD communication link, the first antenna 60, the second antenna 62, the third antenna 64, and the fourth antenna 66 can concurrently receive the incoming high-band RF communication signal 106 over the incoming RF communication link 190, which is also an FDD communication link. In this regard, the primary switching circuitry 68 receives the incoming high-band RF communication signal 106 via the first antenna 60. The controller 184 controls the primary switching circuitry 68 to close the switch SPC2 to couple the primary mid-band-high-band pass filter 158 to the first primary antenna swapping port 84 to provide the incoming high-band RF communication signal 106 received via the first antenna 60 to the second secondary antenna swapping port 90 via the second conductive medium 82. The second antenna 62 also receives the incoming high-band RF communication signal 106 received via the first antenna 60 from the second secondary antenna swapping port 90. The controller 184 controls the secondary switching circuitry 70 to couple the secondary mid-band-high-band pass filter 172 to the first secondary antenna swapping port 88 to provide the incoming high-band RF communication signal 106 received via the second antenna 62 to the second primary antenna swapping port 86 via the first conductive medium 80. The primary switching circuitry 68 receives the incoming high-band RF communication signal 106 received via the second antenna 62 from the second primary antenna swapping port 86. The controller 184 further controls the primary switching circuitry 68 to provide the incoming high-band RF communication signal 106 received via the second antenna 62 to the primary mid-band-high-band I/O port 108.

The secondary switching circuitry 70 receives the incoming high-band RF communication signal 106 received via the first antenna 60 from the second secondary antenna swapping port 90. The controller 184 controls the secondary switching circuitry 70 to close the switch SSB4 to couple the second secondary antenna swapping port 90 to the secondary mid-band-high-band I/O port 144 to provide the incoming high-band RF communication signal 106 received via the first antenna 60 to the secondary mid-band-high-band I/O port 144. The controller 184 also controls the primary switching circuitry 68 to close the switch SPA4 to couple the primary high-band pass filter 164 to the primary high-band I/O port 100 to provide the incoming high-band RF communication signal 106 received via the third antenna 64 to the primary high-band I/O port 100. The controller 184 also controls the secondary switching circuitry 70 to close the switch SSA4 to couple the secondary high-band pass filter 178 to the secondary high-band I/O port 140 to provide the incoming high-band RF communication signal 106 received via the fourth antenna 66 to the secondary high-band I/O port 140.

FIG. 3C is a schematic diagram providing an exemplary illustration of the MIMO antenna swapping circuit 58 of FIG. 2 configured to provide the outgoing high-band RF communication signal 104 to the fourth antenna 66 (the selected antenna) for transmission over the outgoing RF communication link 186. The primary switching circuitry 68 receives the outgoing high-band RF communication signal 104 from the primary mid-band-high-band I/O port 108. The controller 184 controls the primary switching circuitry 68 to close the switch SPB2 to couple the primary mid-band-high-band I/O port 108 to the second primary antenna swapping port 86 to provide the outgoing high-band RF communication signal 104 to the first secondary antenna swapping port 88 via the first conductive medium 80. The secondary switching circuitry 70 receives the outgoing high-band RF communication signal 104 from the first secondary antenna swapping port 88. The controller 184 also controls the secondary switching circuitry 70 to close the switch SSC4 to couple the first secondary antenna swapping port 88 to the secondary high-band pass filter 178 to provide the outgoing high-band RF communication signal 104 to the fourth antenna 66 for transmission over the outgoing RF communication link 186.

When the outgoing RF communication link 186 is an FDD communication link, the first antenna 60, the second antenna 62, the third antenna 64, and the fourth antenna 66 can concurrently receive the incoming high-band RF communication signal 106 over the incoming RF communication link 190, which is also an FDD communication link. In this regard, the primary switching circuitry 68 receives the incoming high-band RF communication signal 106 via the first antenna 60. The controller 184 controls the primary switching circuitry 68 to close the switch SPC2 to couple the primary mid-band-high-band pass filter 158 to the first primary antenna swapping port 84 to provide the incoming high-band RF communication signal 106 received via the first antenna 60 to the second secondary antenna swapping port 90 via the second conductive medium 82. The second antenna 62 also receives the incoming high-band RF communication signal 106 received via the first antenna 60 from the second secondary antenna swapping port 90. The controller 184 controls the secondary switching circuitry 70 to couple the secondary high-band pass filter 178 to the first secondary antenna swapping port 88 to provide the incoming high-band RF communication signal 106 received via the fourth antenna 66 to the second primary antenna swapping port 86 via the first conductive medium 80. The primary switching circuitry 68 receives the incoming high-band RF communication signal 106 received via the fourth antenna 66 from the second primary antenna swapping port 86. The controller 184 further controls the primary switching circuitry 68 to provide the incoming high-band RF communication signal 106 received via the fourth antenna 66 to the primary mid-band-high-band I/O port 108.

The secondary switching circuitry 70 receives the incoming high-band RF communication signal 106 received via the first antenna 60 from the second secondary antenna swapping port 90. The controller 184 controls the secondary switching circuitry 70 to close the switch SSB2 to couple the second secondary antenna swapping port 90 to the secondary high-band I/O port 140 to provide the incoming high-band RF communication signal 106 received via the first antenna 60 to the secondary high-band I/O port 140. The controller 184 also controls the primary switching circuitry 68 to close the switch SPA4 to couple the primary high-band pass filter 164 to the primary high-band I/O port 100 to provide the incoming high-band RF communication signal 106 received via the third antenna 64 to the primary high-band I/O port 100. The controller 184 also controls the secondary switching circuitry 70 to close the switch SSA2 to couple the secondary mid-band-high-band pass filter 172 to the secondary mid-band-high-band I/O port 144 to provide the incoming high-band RF communication signal 106 received via the second antenna 62 to the secondary mid-band-high-band I/O port 144.

With reference back to FIG. 2, the outgoing low-band RF communication signal 96 may be transmitted at a higher power (e.g., 2G GSM at +34 dBm) than the outgoing high-band RF communication signal 104, the outgoing mid-band RF communication signal 116, the outgoing mid-band-high-band RF communication signal 112, the outgoing very-high-band RF communication signal 124, and the outgoing other-band RF communication signal 132. As a result, each of the switches SPB1-SPB5 in the second primary switching element SPB and each of the switches SSB1-SSB5 in the second secondary switching element SSB may have to sustain the higher power associated with the outgoing low-band RF communication signal 96. As a result, each of the switches SPB1-SPB5 and SSB1-SSB5 may need to be a shunt switch, as opposed to being a simple switch. In addition, to be able to share the first conductive medium 80 between the outgoing low-band RF communication signal 96, the outgoing high-band RF communication signal 104, the outgoing mid-band-high-band RF communication signal 112, the outgoing very-high-band communication signal 124, and the outgoing other-band RF communication signal 132, all switches coupled to the first conductive medium 80 need to provide higher isolation to protect the outgoing high-band RF communication signal 104 and the outgoing mid-band-high-band RF communication signal 112 from second and third order harmonics. Accordingly, the switches SPB1-SPB5 and SSB1-SSB5 may need to be higher isolation switches. In this regard, it may be desired to carry separate the switch SPB1 from the switches SPB2-SPB5, and separate the switch SSB1 from the switches SSB2-SSB5, thus allowing the switches SPB2-SPB5 and the switches SSB2-SSB5 to be provided as simple switches with smaller footprints and lower insertion losses.

In this regard, FIG. 4 is a schematic diagram of an exemplary MIMO antenna swapping circuit 192 configured to support antenna swapping among the first antenna 60, the second antenna 62, the third antenna 64, and the fourth antenna 66 of FIG. 2 based on three conductive mediums. Common elements between FIGS. 2 and 4 are shown therein with common element numbers and will not be re-described herein.

With reference to FIG. 4, the MIMO antenna swapping circuit 192 includes primary switching circuitry 194 and secondary switching circuitry 196. In a non-limiting example, the primary switching circuitry 194 and the secondary switching circuitry 196 are each provided as a single-die IC. In another non-limiting example, the primary switching circuitry 194 and the secondary switching circuitry 196 are provided in the same single-die IC.

The primary switching circuitry 194 is configured to be coupled to the first antenna 60 and the third antenna 64. The primary switching circuitry 194 includes the first primary antenna swapping interface 72 and a second primary antenna swapping interface 198. The first primary antenna swapping interface 72 includes the first primary antenna swapping port 84. The second primary antenna swapping interface 198 includes a primary low-band antenna swapping port 200 and a primary mid-band-high-band antenna swapping port 202.

The secondary switching circuitry 196 is configured to be coupled to the second antenna 62 and the fourth antenna 66. The secondary switching circuitry 196 includes a first secondary antenna swapping interface 204 and the second secondary antenna swapping interface 78. The first secondary antenna swapping interface 204 includes a secondary low-band antenna swapping port 206 and a secondary mid-band-high-band antenna swapping port 208. The second secondary antenna swapping interface 78 includes the second secondary antenna swapping port 90. The secondary low-band antenna swapping port 206 is coupled to the primary low-band antenna swapping port 200 via a first conductive medium 210. The secondary mid-band-high-band antenna swapping port 208 is coupled to the primary mid-band-high-band antenna swapping port 202 via a second conductive medium 212. The second secondary antenna swapping port 90 is coupled to the first primary antenna swapping port 84 via a third conductive medium 214. In this regard, the primary switching circuitry 194 is conductively coupled with the secondary switching circuitry 196 to enable antenna swapping among the first antenna 60, the second antenna 62, and the fourth antenna 66 with only three conductive mediums (e.g., coaxial cables).

The primary switching circuitry 194 includes the primary low-band I/O port 92 configured to be coupled to the first low-band transceiver 94 (shown as LB TX/RX in FIG. 4). In a non-limiting example, the first low-band transceiver 94 is configured to transmit the outgoing low-band RF communication signal 96 and receive the incoming low-band RF communication signal 98 in a 450-960 MHz spectrum. In another non-limiting example, the outgoing low-band RF communication signal 96 and the incoming low-band RF communication signal 98 can be carrier aggregated low-band RF communication signals.

The primary switching circuitry 194 includes a first primary mid-band-high-band I/O port 216 configured to be coupled to a first primary mid-band-high-band transceiver 218 (shown as MBHB TX/RX in FIG. 4). In a non-limiting example, the first primary mid-band-high-band transceiver 218 is configured to transmit the outgoing mid-band-high-band RF communication signal 112 and receive the incoming mid-band-high-band RF communication signal 114 in the 1710-2700 MHz spectrum. In this regard, the first primary mid-band-high-band transceiver 218 can also be configured to transmit the outgoing high-band RF communication signal 104 and receive the incoming high-band RF communication signal 106 in the 2300-2700 MHz spectrum. The first primary mid-band-high-band transceiver 218 can also be configured to transmit the outgoing mid-band RF communication signal 116 and receive the incoming mid-band RF communication signal 118 in the 1710-2200 MHz spectrum. The first primary mid-band-high-band transceiver 218 can also be configured to transmit the outgoing mid-band-high-band RF communication signal 112 as an aggregated outgoing RF communication signal including the outgoing mid-band RF communication signal 116 and the outgoing high-band RF communication signal 104. The first primary mid-band-high-band transceiver 218 can also be configured to receive the incoming mid-band-high-band RF communication signal 114 as an aggregated incoming RF communication signal including the incoming mid-band RF communication signal 118 and the incoming high-band RF communication signal 106.

The primary switching circuitry 194 includes a second primary mid-band-high-band I/O port 220 configured to be coupled to a second primary mid-band-high-band transceiver 222 (shown as MBHB TX/RX in FIG. 4). In a non-limiting example, the second primary mid-band-high-band transceiver 222 is configured to transmit the outgoing mid-band-high-band RF communication signal 112 and receive the incoming mid-band-high-band RF communication signal 114 in the 1710-2700 MHz spectrum. In this regard, the second primary mid-band-high-band transceiver 222 can also be configured to transmit the outgoing high-band RF communication signal 104 and receive the incoming high-band RF communication signal 106 in the 2300-2700 MHz spectrum. The second primary mid-band-high-band transceiver 222 can also be configured to transmit the outgoing mid-band RF communication signal 116 and receive the incoming mid-band RF communication signal 118 in the 1710-2200 MHz spectrum. The second primary mid-band-high-band transceiver 222 can also be configured to transmit the outgoing mid-band-high-band RF communication signal 112 as the aggregated outgoing RF communication signal including the outgoing mid-band RF communication signal 116 and the outgoing high-band RF communication signal 104. The second primary mid-band-high-band transceiver 222 can also be configured to receive the incoming mid-band-high-band RF communication signal 114 as the aggregated incoming RF communication signal including the incoming mid-band RF communication signal 118 and the incoming high-band RF communication signal 106.

The secondary switching circuitry 196 includes a first secondary mid-band-high-band I/O port 224 configured to be coupled to a first secondary mid-band-high-band receiver 226 (shown as MBHB RX in FIG. 4). In a non-limiting example, the first secondary mid-band-high-band receiver 226 is configured to receive the incoming mid-band-highband RF communication signal 114 in the 1710-2700 MHz spectrum. In this regard, the first secondary mid-band-high-band receiver 226 can also be configured to receive the incoming high-band RF communication signal 106 in the 2300-2700 MHz spectrum and the incoming mid-band RF communication signal 118 in the 1710-2200 MHz spectrum. The first secondary mid-band-high-band receiver 226 can also be configured to receive the incoming mid-band-high-band RF communication signal 114 as the aggregated incoming RF communication signal including the incoming mid-band RF communication signal 118 and the incoming high-band RF communication signal 106.

The secondary switching circuitry 196 includes a second secondary mid-band-high-band I/O port 228 configured to be coupled to a second secondary mid-band-high-band receiver 230 (shown as MBHB RX in FIG. 4). In a non-limiting example, the second secondary mid-band-high-band receiver 230 is configured to receive the incoming mid-band-high-band RF communication signal 114 in the 1710-2700 MHz spectrum. In this regard, the second secondary mid-band-high-band receiver 230 can also be configured to receive the incoming high-band RF communication signal 106 in the 2300-2700 MHz spectrum, and the incoming mid-band RF communication signal 118 in the 1710-2200 MHz spectrum. The second secondary mid-band-high-band receiver 230 can also be configured to receive the incoming mid-band-high-band RF communication signal 114 as the aggregated incoming RF communication signal including the incoming mid-band RF communication signal 118 and the incoming high-band RF communication signal 106.

With continuing reference to FIG. 4, the primary switching circuitry 194 can be coupled to the first antenna 60 via at least one first primary multiplexer circuit 231, which can be a duplexer circuit, a triplexer circuit, or a quadplexer circuit, for example. The first primary multiplexer circuit 231 includes the primary low-band pass filter 156, a first primary mid-band-high-band pass filter 232, and the primary other-band pass filter 160. In this regard, the primary switching circuitry 194 can be coupled to the first antenna 60 via the primary low-band pass filter 156, the first primary mid-band-high-band pass filter 232, and/or the primary other-band pass filter 160. The primary low-band pass filter 156, the first primary mid-band-high-band pass filter 232, and the primary other-band pass filter 160 may be coupled to the first antenna 60 via the respective tuner 162. The primary switching circuitry 194 can be coupled to the third antenna 64 via at least one second primary multiplexer circuit 233, which can be a duplexer circuit, a triplexer circuit, or a quadplexer circuit, for example. The second primary multiplexer circuit 233 includes a second primary mid-band-high-band pass filter 234 and the primary very-high-band pass filter 166. In this regard, the primary switching circuitry 194 can be coupled to the third antenna 64 via the second primary mid-band-high-band pass filter 234 and/or the primary very-high-band pass filter 166. The second primary mid-band-high-band pass filter 234 and the primary very-high-band pass filter 166 may be coupled to the third antenna 64 via the respective tuner 168.

The secondary switching circuitry 196 can be coupled to the second antenna 62 via at least one first secondary multiplexer circuit 235, which can be a duplexer circuit, a triplexer circuit, or a quadplexer circuit, for example. The first secondary multiplexer circuit 235 includes the secondary low-band pass filter 170, a first secondary mid-band-high-band pass filter 236, and the secondary other-band pass filter 174. In this regard, the secondary switching circuitry 196 can be coupled to the second antenna 62 via the secondary low-band pass filter 170, the first secondary mid-band-high-band pass filter 236, and/or the secondary other-band pass filter 174. The secondary low-band pass filter 170, the first secondary mid-band-high-band pass filter 236, and the secondary other-band pass filter 174 may be coupled to the second antenna 62 via the respective tuner 176. The secondary switching circuitry 196 can be coupled to the fourth antenna 66 via at least one second secondary multiplexer circuit 237, which can be a duplexer circuit, a triplexer circuit, or a quadplexer circuit, for example. The second secondary multiplexer circuit 237 includes a second secondary mid-band-high-band pass filter 238 and the secondary very-high-band pass filter 180. In this regard, the secondary switching circuitry 196 can be coupled to the fourth antenna 66 via the second secondary mid-band-high-band pass filter 238 and/or the secondary very-high-band pass filter 180. The second secondary mid-band-high-band pass filter 238 and the secondary very-high-band pass filter 180 may be coupled to the fourth antenna 66 via the respective tuner 182.

With continuing reference to FIG. 4, the primary switching circuitry 194 includes a first-second primary switching element SPBL and a second-second primary switching element SPBH. The first-second primary switching element SPBL includes a switch SPBL-1. The second-second primary switching element SPBH includes switches SPBH-1, SPBH-2, SPBH-3, and SPBH-4. The secondary switching circuitry 196 includes a first-third secondary switching element SSCL and a second-third secondary switching element SSCH. The first-third secondary switching element SSCL includes a switch SSCL-1. The second-third secondary switching element SSCH includes switches SSCH-1, SSCH-2, SSCH-3, and SSCH-4.

To help illustrate operational principles of the MIMO antenna swapping circuit 192, FIGS. 5A-5C are discussed next as non-limiting examples. It shall be appreciated that the working examples discussed with references to FIGS. 5A-5C do not represent all possible antenna swapping scenarios that can be supported by the MIMO antenna swapping circuit 192. Common elements between FIGS. 2, 4, and 5A-5C are shown therein with common element numbers and will not be re-described herein. It is further assumed that the switches in the first primary switching element SPA, the first-second primary switching element SPBL, the second-second primary switching element SPBH, the third primary switching element SPC, the first secondary switching element SSA, the second secondary switching element SSB, the first-third secondary switching element SSCL, and the second-third secondary switching element SSCH are in an open position at a start of an antenna swapping operation.

FIG. 5A is a schematic diagram providing an exemplary illustration of the MIMO antenna swapping circuit 192 of FIG. 4 configured to provide the outgoing mid-band-high-band RF communication signal 112 to the first antenna 60 (the selected antenna) for transmission over the outgoing RF communication link 186. The primary switching circuitry 194 receives the outgoing mid-band-high-band RF communication signal 112 from the first primary mid-band-high-band I/O port 216. The controller 184 controls the primary switching circuitry 194 to close the switch SPA2 to couple the first primary mid-band-high-band I/O port 216 to the first primary mid-band-high-band pass filter 232. Accordingly, the first antenna 60 can transmit the outgoing mid-band-high-band RF communication signal 112 over the outgoing RF communication link 186.

When the outgoing RF communication link 186 is an FDD communication link, the first antenna 60, the second antenna 62, the third antenna 64, and the fourth antenna 66 can concurrently receive the incoming mid-band-high-band RF communication signal 114 over the incoming RF communication link 190, which is also an FDD communication link. In this regard, the primary switching circuitry 194 receives the incoming mid-band-high-band RF communication signal 114 via the first antenna 60 and provides the incoming mid-band-high-band RF communication signal 114 to the first primary mid-band-high-band I/O port 216. In addition, the controller 184 controls the primary switching circuitry 194 to close the switch SPA4 to couple the second primary mid-band-high-band I/O port 220 to the second primary mid-band-high-band pass filter 234 to receive the incoming mid-band-high-band RF communication signal 114 via the third antenna 64.

The controller 184 further controls the secondary switching circuitry 196 to close the switch SSA2 to couple the first secondary mid-band-high-band I/O port 224 to the first secondary mid-band-high-band pass filter 236 to receive the incoming mid-band-high-band RF communication signal 114 via the second antenna 62. The controller 184 further controls the secondary switching circuitry 196 to close the switch SSA4 to couple the second secondary mid-band-high-band I/O port 228 to the second secondary mid-band-high-band pass filter 238 to receive the incoming mid-band-high-band RF communication signal 114 via the fourth antenna 66. In this regard, the MIMO antenna swapping circuit 192 is configured to receive the incoming mid-band-high-band RF communication signal 114 via the first antenna 60, the second antenna 62, the third antenna 64, and the fourth antenna 66, while transmitting concurrently the outgoing mid-band-high-band RF communication signal 112 via the first antenna 60.

FIG. 5B is a schematic diagram providing an exemplary illustration of the MIMO antenna swapping circuit 192 of FIG. 4 configured to provide the outgoing mid-band-high-band RF communication signal 112 to the second antenna 62 (the selected antenna) for transmission over the outgoing RF communication link 186. The primary switching circuitry 194 receives the outgoing mid-band-high-band RF communication signal 112 from the first primary mid-band-high-band I/O port 216. The controller 184 controls the primary switching circuitry 194 to close the switch SPBH-1 to couple the first primary mid-band-high-band I/O port 216 to the primary mid-band-high-band antenna swapping port 202 to provide the outgoing mid-band-high-band RF communication signal 112 to the secondary mid-band-high-band antenna swapping port 208 via the second conductive medium 212. The secondary switching circuitry 196 receives the outgoing mid-band-high-band RF communication signal 112 from the secondary mid-band-high-band antenna swapping port 208. The controller 184 also controls the secondary switching circuitry 196 to close the switch SSCH-1 to couple the secondary mid-band-high-band antenna swapping port 208 to the first secondary mid-band-high-band pass filter 236 to provide the outgoing mid-band-high-band RF communication signal 112 to the second antenna 62 for transmission over the outgoing RF communication link 186.

When the outgoing RF communication link 186 is an FDD communication link, the first antenna 60, the second antenna 62, the third antenna 64, and the fourth antenna 66 can concurrently receive the incoming mid-band-high-band RF communication signal 114 over the incoming RF communication link 190, which is also an FDD communication link. In this regard, the primary switching circuitry 194 receives the incoming mid-band-high-band RF communication signal 114 via the first antenna 60. The controller 184 controls the primary switching circuitry 194 to close the switch SPC2 to couple the first primary mid-band-high-band pass filter 232 to the first primary antenna swapping port 84 to provide the incoming mid-band-high-band RF communication signal 114 received via the first antenna 60 to the second secondary antenna swapping port 90 via the third conductive medium 214. The secondary switching circuitry 196 receives the incoming mid-band-high-band RF communication signal 114 received via the first antenna 60 from the second secondary antenna swapping port 90. The controller 184 controls the secondary switching circuitry 196 to close the switch SSB4 to couple the second secondary antenna swapping port 90 to the first secondary mid-band-high-band I/O port 224 to provide the incoming mid-band-high-band RF communication signal 114 received via the first antenna 60 to the first secondary mid-band-high-band I/O port 224.

The controller 184 also controls the primary switching circuitry 194 to close the switch SPA4 to couple the second primary mid-band-high-band pass filter 234 to the second primary mid-band-high-band I/O port 220 to provide the incoming mid-band-high-band RF communication signal 114 received via the third antenna 64 to the second primary mid-band-high-band I/O port 220. The controller 184 also controls the secondary switching circuitry 196 to close the switch SSA4 to couple the second secondary mid-band-high-band pass filter 238 to the second secondary mid-band-high-band I/O port 228 to provide the incoming mid-band-high-band RF communication signal 114 received via the fourth antenna 66 to the second secondary mid-band-high-band I/O port 228.

FIG. 5C is a schematic diagram providing an exemplary illustration of the MIMO antenna swapping circuit 192 of FIG. 4 configured to provide the outgoing mid-band-high-band RF communication signal 112 to the fourth antenna 66 (the selected antenna) for transmission over the outgoing RF communication link 186. The primary switching circuitry 194 receives the outgoing mid-band-high-band RF communication signal 112 from the first primary mid-band-high-band I/O port 216. The controller 184 controls the primary switching circuitry 194 to close the switch SPBH-1 to couple the first primary mid-band-high-band I/O port 216 to the primary mid-band-high-band antenna swapping port 202 to provide the outgoing mid-band-high-band RF communication signal 112 to the secondary mid-band-high-band antenna swapping port 208 via the second conductive medium 212. The secondary switching circuitry 196 receives the outgoing mid-band-high-band RF communication signal 112 from the secondary mid-band-high-band antenna swapping port 208. The controller 184 also controls the secondary switching circuitry 196 to close the switch SSCH-3 to couple the secondary mid-band-high-band antenna swapping port 208 to the second secondary mid-band-high-band pass filter 238 to provide the outgoing mid-band-high-band RF communication signal 112 to the fourth antenna 66 for transmission over the outgoing RF communication link 186.

When the outgoing RF communication link 186 is an FDD communication link, the first antenna 60, the second antenna 62, the third antenna 64, and the fourth antenna 66 can concurrently receive the incoming mid-band-high-band RF communication signal 114 over the incoming RF communication link 190, which is also an FDD communication link. In this regard, the primary switching circuitry 194 receives the incoming mid-band-high-band RF communication signal 114 via the first antenna 60. The controller 184 controls the primary switching circuitry 194 to close the switch SPC2 to couple the first primary mid-band-high-band pass filter 232 to the first primary antenna swapping port 84 to provide the incoming mid-band-high-band RF communication signal 114 received via the first antenna 60 to the second secondary antenna swapping port 90 via the third conductive medium 214. The secondary switching circuitry 196 receives the incoming mid-band-high-band RF communication signal 114 received via the first antenna 60 from the second secondary antenna swapping port 90. The controller 184 controls the secondary switching circuitry 196 to close the switch SSB2 to couple the second secondary antenna swapping port 90 to the second secondary mid-band-high-band I/O port 228 to provide the incoming mid-band-high-band RF communication signal 114 received via the first antenna 60 to the second secondary mid-band-high-band I/O port 228.

The controller 184 also controls the primary switching circuitry 194 to close the switch SPA4 to couple the second primary mid-band-high-band pass filter 234 to the second primary mid-band-high-band I/O port 220 to provide the incoming mid-band-high-band RF communication signal 114 received via the third antenna 64 to the second primary mid-band-high-band I/O port 220. The controller 184 also controls the secondary switching circuitry 196 to close the switch SSA2 to couple the first secondary mid-band-high-band pass filter 236 to the first secondary mid-band-high-band I/O port 224 to provide the incoming mid-band-high-band RF communication signal 114 received via the second antenna 62 to the first secondary mid-band-high-band I/O port 224.

With reference back to FIG. 2, the first primary switching element SPA, the second primary switching element SPB, and the third primary switching element SPC in the primary switching circuitry 68 may generate harmonics due to non-linearity of these switching elements. Likewise, the first secondary switching element SSA, the second secondary switching element SSB, and the third secondary switching element SSC in the secondary switching circuitry 70 may also generate harmonics due to non-linearity of these switching elements. However, it may be possible to replace the first primary switching element SPA, the second primary switching element SPB, the third primary switching element SPC, the first secondary switching element SSA, the second secondary switching element SSB, and the third secondary switching element SSC with high-linearity switches such as micro electro mechanical systems (MEMS).

In this regard, FIG. 6 is a schematic diagram of an exemplary MIMO antenna swapping circuit 240 including primary switching circuitry 242 and secondary switching circuitry 244 with high linearity. The primary switching circuitry 242 includes one or more primary switches 246 coupled to the first primary antenna swapping interface 72 and the second primary antenna swapping interface 74. The secondary switching circuitry 244 includes one or more secondary switches 248 coupled to the first secondary antenna swapping interface 76 and the second secondary antenna swapping interface 78. In a non-limiting example, the primary switches 246 and the secondary switches 248 are MEMS switches capable of providing a higher degree of linearity. As such, the primary switching circuitry 242 and the secondary switching circuitry 244 are high-linearity switching circuitries that can help suppress the harmonics in an outgoing RF communication signal (e.g., the outgoing high-band RF communication signal 104). As a result, the primary switching circuitry 242 can be configured to couple the first primary multiplexer circuit 155 and the second primary multiplexer circuit 163 between the first antenna 60 and the third antenna 64. Likewise, the secondary switching circuitry 244 can be configured to couple the first secondary multiplexer circuit 169 and the second secondary multiplexer circuit 177 between the second antenna 62 and the fourth antenna 66.

Those skilled in the art will recognize improvements and modifications to the preferred embodiments of the present disclosure. All such improvements and modifications are considered within the scope of the concepts disclosed herein and the claims that follow.

What is claimed is:

1. A multiple-input multiple-output (MIMO) antenna swapping circuit, comprising:
   primary switching circuitry configured to be coupled to a first antenna and a third antenna, the primary switching circuitry comprising a first primary antenna swapping interface and a second primary antenna swapping interface; and
   secondary switching circuitry configured to be coupled to a second antenna and a fourth antenna, the secondary switching circuitry comprising:
      a first secondary antenna swapping interface coupled to the second primary antenna swapping interface via no more than two first conductive mediums; and
      a second secondary antenna swapping interface coupled to the first primary antenna swapping interface via only one second conductive medium;
   wherein the primary switching circuitry is configured to receive and provide an outgoing radio frequency (RF) communication signal to a selected antenna among the first antenna, the second antenna, and the fourth antenna for transmission over an outgoing RF communication link;
   wherein a count of the no more than two first conductive mediums and the only one second conductive medium is less than four.

2. The MIMO antenna swapping circuit of claim 1 communicatively coupled to a controller configured to control the primary switching circuitry and the secondary switching circuitry to provide the outgoing RF communication signal to the selected antenna among the first antenna, the second antenna, and the fourth antenna.

3. The MIMO antenna swapping circuit of claim 1 wherein:
   the first primary antenna swapping interface comprises a first primary antenna swapping port;
   the second primary antenna swapping interface comprises a second primary antenna swapping port;
   the first secondary antenna swapping interface comprises a first secondary antenna swapping port coupled to the second primary antenna swapping port via a first conductive medium; and
   the second secondary antenna swapping interface comprises a second secondary antenna swapping port coupled to the first primary antenna swapping port via a second conductive medium.

4. The MIMO antenna swapping circuit of claim 3 wherein:
   the primary switching circuitry comprises:
      a primary low-band input/output (I/O) port configured to be coupled to a first low-band transceiver;
      a primary mid-band-high-band I/O port configured to be coupled to a first mid-band-high-band transceiver; and a primary high-band I/O port configured to be coupled to a first high-band transceiver; and the secondary switching circuitry comprises:
a secondary high-band I/O port configured to be coupled to a second high-band receiver;
a secondary low-band I/O port configured to be coupled to a second low-band receiver; and
a secondary mid-band-high-band I/O port configured to be coupled to a second mid-band-high-band receiver.

5. The MIMO antenna swapping circuit of claim 4 wherein:
the primary switching circuitry is configured to be coupled to the first antenna via at least one first primary multiplexer circuit comprising a primary low-band pass filter and a primary mid-band-high-band pass filter;
the primary switching circuitry is configured to be coupled to the third antenna via at least one second primary multiplexer circuit comprising a primary high-band pass filter;
the secondary switching circuitry is configured to be coupled to the second antenna via at least one first secondary multiplexer circuit comprising a secondary low-band pass filter and a secondary mid-band-high-band pass filter; and
the secondary switching circuitry is configured to be coupled to the fourth antenna via at least one second secondary multiplexer circuit comprising a secondary high-band pass filter.

6. The MIMO antenna swapping circuit of claim 5 wherein:
the primary switching circuitry is configured to:
receive an outgoing high-band RF communication signal from the primary mid-band-high-band I/O port;
couple the primary mid-band-high-band I/O port to the primary mid-band-high-band pass filter to provide the outgoing high-band RF communication signal to the first antenna for transmission over the outgoing RF communication link; and
couple the primary high-band pass filter to the primary high-band I/O port to provide an incoming high-band RF communication signal received via the third antenna to the primary high-band I/O port; and
the secondary switching circuitry is configured to:
couple the secondary high-band pass filter to the secondary high-band I/O port to provide the incoming high-band RF communication signal received via the fourth antenna to the secondary high-band I/O port; and
couple the secondary mid-band-high-band pass filter to the secondary mid-band-high-band I/O port to provide the incoming high-band RF communication signal received via the second antenna to the secondary mid-band-high-band I/O port.

7. The MIMO antenna swapping circuit of claim 6 wherein:
the first antenna is configured to receive the incoming high-band RF communication signal; and
the primary switching circuitry is further configured to provide the incoming high-band RF communication signal received via the first antenna to the primary mid-band-high-band I/O port.

8. The MIMO antenna swapping circuit of claim 5 wherein:
the primary switching circuitry is configured to:
receive an outgoing high-band RF communication signal from the primary mid-band-high-band I/O port;
couple the primary mid-band-high-band I/O port to the second primary antenna swapping port to provide the outgoing high-band RF communication signal to the first secondary antenna swapping port via the first conductive medium;
couple the primary mid-band-high-band pass filter to the first primary antenna swapping port to provide an incoming high-band RF communication signal received via the first antenna to the second secondary antenna swapping port via the second conductive medium; and
couple the primary high-band pass filter to the primary high-band I/O port to provide the incoming high-band RF communication signal received via the third antenna to the primary high-band I/O port; and
the secondary switching circuitry is configured to:
receive the outgoing high-band RF communication signal from the first secondary antenna swapping port;
couple the first secondary antenna swapping port to the secondary mid-band-high-band pass filter to provide the outgoing high-band RF communication signal to the second antenna for transmission over the outgoing RF communication link;
receive the incoming high-band RF communication signal received via the first antenna from the second secondary antenna swapping port;
couple the second secondary antenna swapping port to the secondary mid-band-high-band I/O port to provide the incoming high-band RF communication signal received via the first antenna to the secondary mid-band-high-band I/O port; and
couple the secondary high-band pass filter to the secondary high-band I/O port to provide the incoming high-band RF communication signal received via the fourth antenna to the secondary high-band I/O port.

9. The MIMO antenna swapping circuit of claim 8 wherein:
the second antenna is configured to receive the incoming high-band RF communication signal;
the secondary switching circuitry is further configured to couple the secondary mid-band-high-band pass filter to the first secondary antenna swapping port to provide the incoming high-band RF communication signal received via the second antenna to the second primary antenna swapping port via the first conductive medium; and
the primary switching circuitry is further configured to:
receive the incoming high-band RF communication signal received via the second antenna from the second primary antenna swapping port; and
provide the incoming high-band RF communication signal received via the second antenna to the primary mid-band-high-band I/O port.

10. The MIMO antenna swapping circuit of claim 5 wherein:
the primary switching circuitry is configured to:
receive an outgoing high-band RF communication signal from the primary mid-band-high-band I/O port;
couple the primary mid-band-high-band I/O port to the second primary antenna swapping port to provide the outgoing high-band RF communication signal to the first secondary antenna swapping port via the first conductive medium;
couple the primary mid-band-high-band pass filter to the first primary antenna swapping port to provide an incoming high-band RF communication signal received via the first antenna to the second secondary antenna swapping port via the second conductive medium; and couple the primary high-band pass filter to the primary high-band I/O port to provide the incoming high-band RF communication signal received via the third antenna to the primary high-band I/O port; and the secondary switching circuitry is configured to:

receive the outgoing high-band RF communication signal from the first secondary antenna swapping port;

couple the first secondary antenna swapping port to the secondary high-band pass filter to provide the outgoing high-band RF communication signal to the fourth antenna for transmission over the outgoing RF communication link;

receive the incoming high-band RF communication signal received via the first antenna from the second secondary antenna swapping port;

couple the second secondary antenna swapping port to the secondary high-band I/O port to provide the incoming high-band RF communication signal received via the first antenna to the secondary high-band I/O port; and couple the secondary mid-band-high-band pass filter to the secondary mid-band-high-band I/O port to provide the incoming high-band RF communication signal received via the second antenna to the secondary mid-band-high-band I/O port.

11. The MIMO antenna swapping circuit of claim 10 wherein:

the fourth antenna is configured to receive the incoming high-band RF communication signal;

the secondary switching circuitry is further configured to couple the secondary high-band pass filter to the first secondary antenna swapping port to provide the incoming high-band RF communication signal received via the fourth antenna to the second primary antenna swapping port via the first conductive medium; and the primary switching circuitry is further configured to:
receive the incoming high-band RF communication signal received via the fourth antenna from the second primary antenna swapping port; and
provide the incoming high-band RF communication signal received via the fourth antenna to the primary mid-band-high-band I/O port.

12. The MIMO antenna swapping circuit of claim 1 wherein:

the first primary antenna swapping interface comprises a first primary antenna swapping port;

the second primary antenna swapping interface comprises a primary low-band antenna swapping port and a primary mid-band-high-band antenna swapping port;

the first secondary antenna swapping interface comprises:
a secondary low-band antenna swapping port coupled to the primary low-band antenna swapping port via a first conductive medium; and
a secondary mid-band-high-band antenna swapping port coupled to the primary mid-band-high-band antenna swapping port via a second conductive medium; and the second secondary antenna swapping interface comprises a second secondary antenna swapping port coupled to the first primary antenna swapping port via a third conductive medium.

13. The MIMO antenna swapping circuit of claim 12 wherein:

the primary switching circuitry comprises:
a primary low-band I/O port configured to be coupled to a first low-band transceiver;
a first primary mid-band-high-band I/O port configured to be coupled to a first primary mid-band-high-band transceiver; and
a second primary mid-band-high-band I/O port configured to be coupled to a second primary mid-band-high-band transceiver; and the secondary switching circuitry comprises:
a secondary low-band I/O port configured to be coupled to a second low-band receiver;
a first secondary mid-band-high-band I/O port configured to be coupled to a first secondary mid-band-high-band receiver; and
a second secondary mid-band-high-band I/O port configured to be coupled to a second secondary mid-band-high-band receiver.

14. The MIMO antenna swapping circuit of claim 13 wherein:

the primary switching circuitry is configured to be coupled to the first antenna via at least one first primary multiplexer circuit comprising a primary low-band pass filter and a first primary mid-band-high-band pass filter;

the primary switching circuitry is configured to be coupled to the third antenna via at least one second primary multiplexer circuit comprising a second primary mid-band-high-band pass filter;

the secondary switching circuitry is configured to be coupled to the second antenna via at least one first secondary multiplexer circuit comprising a secondary low-band pass filter and a first secondary mid-band-high-band pass filter; and the secondary switching is configured to be coupled to the fourth antenna via at least one second secondary multiplexer circuit comprising a second secondary mid-band-high-band pass filter.

15. The MIMO antenna swapping circuit of claim 14 wherein:

the primary switching circuitry is configured to:
receive an outgoing mid-band-high-band RF communication signal from the first primary mid-band-high-band I/O port;
couple the first primary mid-band-high-band I/O port to the first primary mid-band-high-band pass filter to provide the outgoing mid-band-high-band RF communication signal to the first antenna for transmission over the outgoing RF communication link; and
couple the second primary mid-band-high-band pass filter to the second primary mid-band-high-band I/O port to provide an incoming mid-band-high-band RF communication signal received via the third antenna to the second primary mid-band-high-band I/O port; and the secondary switching circuitry is configured to:
couple the first secondary mid-band-high-band pass filter to the first secondary mid-band-high-band I/O port to provide the incoming mid-band-high-band RF communication signal received via the second antenna to the first secondary mid-band-high-band I/O port; and
couple the second secondary mid-band-high-band pass filter to the second secondary mid-band-high-band I/O port to provide the incoming mid-band-high-band RF communication signal received via the fourth antenna to the second secondary mid-band-high-band I/O port.

16. The MIMO antenna swapping circuit of claim 15 wherein:
the first antenna is configured to receive the incoming mid-band-high-band RF communication signal; and
the primary switching circuitry is further configured to provide the incoming mid-band-high-band RF communication signal received via the first antenna to the first primary mid-band-high-band I/O port.

17. The MIMO antenna swapping circuit of claim 14 wherein:
the primary switching circuitry is configured to:
receive an outgoing mid-band-high-band RF communication signal from the first primary mid-band-high-band I/O port;
couple the first primary mid-band-high-band I/O port to the primary mid-band-high-band antenna swapping port to provide the outgoing mid-band-high-band RF communication signal to the secondary mid-band-high-band antenna swapping port via the second conductive medium;
couple the first primary mid-band-high-band pass filter to the first primary antenna swapping port to provide an incoming mid-band-high-band RF communication signal received via the first antenna to the second secondary antenna swapping port via the third conductive medium; and
couple the second primary mid-band-high-band pass filter to the second primary mid-band-high-band I/O port to provide the incoming mid-band-high-band RF communication signal received via the third antenna to the second primary mid-band-high-band I/O port; and
the secondary switching circuitry is configured to:
receive the outgoing mid-band-high-band RF communication signal from the secondary mid-band-high-band antenna swapping port;
couple the secondary mid-band-high-band antenna swapping port to the first secondary mid-band-high-band pass filter to provide the outgoing mid-band-high-band RF communication signal to the second antenna for transmission over the outgoing RF communication link;
receive the incoming mid-band-high-band RF communication signal received via the first antenna from the second secondary antenna swapping port;
couple the second secondary antenna swapping port to the first secondary mid-band-high-band I/O port to provide the incoming mid-band-high-band RF communication signal received via the first antenna to the first secondary mid-band-high-band I/O port; and
couple the second secondary mid-band-high-band pass filter to the second secondary mid-band-high-band I/O port to provide the incoming mid-band-high-band RF communication signal received via the fourth antenna to the second secondary mid-band-high-band I/O port.

18. The MIMO antenna swapping circuit of claim 17 wherein:
the second antenna is configured to receive the incoming mid-band-high-band RF communication signal;
the secondary switching circuitry is further configured to couple the first secondary mid-band-high-band pass filter to the secondary mid-band-high-band antenna swapping port to provide the incoming mid-band-high-band RF communication signal received via the second antenna to the primary mid-band-high-band antenna swapping port via the second conductive medium; and the primary switching circuitry is further configured to:
receive the incoming mid-band-high-band RF communication signal received via the second antenna from the primary mid-band-high-band antenna swapping port; and
provide the incoming mid-band-high-band RF communication signal received via the second antenna to the first primary mid-band-high-band I/O port.

19. The MIMO antenna swapping circuit of claim 14 wherein:
the primary switching circuitry is configured to:
receive an outgoing mid-band-high-band RF communication signal from the first primary mid-band-high-band I/O port;
couple the first primary mid-band-high-band I/O port to the primary mid-band-high-band antenna swapping port to provide the outgoing mid-band-high-band RF communication signal to the secondary mid-band-high-band antenna swapping port via the second conductive medium;
couple the first primary mid-band-high-band pass filter to the first primary antenna swapping port to provide an incoming mid-band-high-band RF communication signal received via the first antenna to the second secondary antenna swapping port via the third conductive medium; and
couple the second primary mid-band-high-band pass filter to the second primary mid-band-high-band I/O port to provide the incoming mid-band-high-band RF communication signal received via the third antenna to the second primary mid-band-high-band I/O port; and
the secondary switching circuitry is configured to:
receive the outgoing mid-band-high-band RF communication signal from the secondary mid-band-high-band antenna swapping port;
couple the secondary mid-band-high-band antenna swapping port to the second secondary mid-band-high-band pass filter to provide the outgoing mid-band-high-band RF communication signal to the fourth antenna for transmission over the outgoing RF communication link;
receive the incoming mid-band-high-band RF communication signal received via the first antenna from the second secondary antenna swapping port;
couple the second secondary antenna swapping port to the second secondary mid-band-high-band I/O port to provide the incoming mid-band-high-band RF communication signal received via the first antenna to the second secondary mid-band-high-band I/O port; and
couple the first secondary mid-band-high-band pass filter to the first secondary mid-band-high-band I/O port to provide the incoming mid-band-high-band RF communication signal received via the second antenna to the first secondary mid-band-high-band I/O port.

20. The MIMO antenna swapping circuit of claim 19 wherein:
the fourth antenna is configured to receive the incoming mid-band-high-band RF communication signal;
the secondary switching circuitry is further configured to couple the second secondary mid-band-high-band pass filter to the secondary mid-band-high-band antenna swapping port to provide the incoming mid-band-high-band RF communication signal received via the fourth antenna to the primary mid-band-high-band antenna swapping port via the second conductive medium; and the primary switching circuitry is further configured to:
- receive the incoming mid-band-high-band RF communication signal received via the fourth antenna from the primary mid-band-high-band antenna swapping port; and
- provide the incoming mid-band-high-band RF communication signal received via the fourth antenna to the first primary mid-band-high-band I/O port.

21. A multiple-input multiple-output (MIMO) antenna swapping circuit, comprising:
- primary switching circuitry configured to couple at least one first primary multiplexer circuit and at least one second primary multiplexer circuit between a first antenna and a third antenna, the primary switching circuitry comprising:
  - a first primary antenna swapping interface;
  - a second primary antenna swapping interface; and
  - one or more primary switches coupled to the first primary antenna swapping interface and the second primary antenna swapping interface; and
- secondary switching circuitry configured to couple at least one first secondary multiplexer circuit and at least one second secondary multiplexer circuit between a second antenna and a fourth antenna, the secondary switching circuitry comprising:
  - a first secondary antenna swapping interface coupled to the second primary antenna swapping interface via a first conductive medium;
  - a second secondary antenna swapping interface coupled to the first primary antenna swapping interface via a second conductive medium; and
  - one or more secondary switches coupled to the first secondary antenna swapping interface and the second secondary antenna swapping interface;
- wherein the primary switching circuitry is configured to receive and provide an outgoing radio frequency (RF) communication signal to a selected antenna among the first antenna, the second antenna, and the fourth antenna for transmission over an outgoing RF communication link.

22. The MIMO antenna swapping circuit of claim 21, wherein the one or more primary switches and the one or more secondary switches are micro electro mechanical systems (MEMS).

* * * * *